(12) United States Patent
Knapik

(10) Patent No.: US 12,128,970 B2
(45) Date of Patent: Oct. 29, 2024

(54) QUICK CONNECT LOGISTICS TRAILER

(71) Applicant: Antonio Knapik, Lexington, KY (US)

(72) Inventor: Antonio Knapik, Lexington, KY (US)

( * ) Notice: Subject to any disclaimer, the term of this patent is extended or adjusted under 35 U.S.C. 154(b) by 309 days.

(21) Appl. No.: 17/878,366

(22) Filed: Aug. 1, 2022

(65) Prior Publication Data

US 2023/0034152 A1 Feb. 2, 2023

Related U.S. Application Data

(60) Provisional application No. 63/228,192, filed on Aug. 2, 2021.

(51) Int. Cl.
| | |
|---|---|
| B62D 53/04 | (2006.01) |
| B62D 33/02 | (2006.01) |
| B62D 63/08 | (2006.01) |

(52) U.S. Cl.
CPC ........... B62D 53/045 (2013.01); B62D 33/02 (2013.01); B62D 63/08 (2013.01)

(58) Field of Classification Search
CPC ...... B62D 53/045; B62D 33/02; B62D 63/08; B62D 51/02; B62D 53/005; B60P 1/5457; B60D 1/481; B60D 1/64; B60D 1/36
See application file for complete search history.

(56) References Cited

U.S. PATENT DOCUMENTS

| | | | | |
|---|---|---|---|---|
| 3,410,431 | A * | 11/1968 | Vik | ........................ B66F 9/184 |
| | | | | 414/607 |
| 3,894,616 | A | 7/1975 | Kawahishi et al. | |
| 4,440,417 | A | 4/1984 | Kirchner | |
| 4,538,953 | A * | 9/1985 | Abramson, Jr. | .......... B66F 9/18 |
| | | | | 414/785 |
| 6,182,797 | B1 | 2/2001 | Tebbe et al. | |
| 9,415,984 | B1 * | 8/2016 | Shinosky, Jr. | ........... B65G 1/04 |
| 10,442,667 | B2 * | 10/2019 | Hokanson | ................ B66F 9/18 |
| 2014/0248111 | A1 * | 9/2014 | Williams | ................. B66F 9/12 |
| | | | | 414/724 |

(Continued)

FOREIGN PATENT DOCUMENTS

| | | | |
|---|---|---|---|
| CN | 213037363 U | * | 4/2021 |
| CN | 214024763 U | * | 8/2021 |

(Continued)

*Primary Examiner* — James M Dolak
*Assistant Examiner* — Michael T. Walsh
(74) *Attorney, Agent, or Firm* — Michael Coblenz

(57) ABSTRACT

A quick connect logistics trailer used with a forked vehicle, where the trailer includes two movable fork guides to attach to the forks of the forked vehicle, a fork guide spacer to move the fork guides to accommodate different fork spacing, and a movable top platform attached by hinges to allow access to components under the top platform. The quick connect logistics trailer also includes side mounted fork pockets to lift the logistics trailer. The quick connect logistics trailer also includes two linear latches attached to the fork guides that can be attached to the forks of the vehicle, and two switchable magnets attached to each fork guide to attach the fork guides to the forks. The quick connect logistics trailer can also include a trailer clip attached to the trailer and a fork truck clip assembly attached to the forked vehicle, where the trailer clip assembly temporarily but securely attaches to the fork truck clip assembly to allow the forked vehicle to tow the logistics trailer.

7 Claims, 19 Drawing Sheets

(56) References Cited

U.S. PATENT DOCUMENTS

2014/0299706 A1* 10/2014 DiSabantonio, III .. B65D 19/12
                                                          242/598
2020/0095103 A1    3/2020  Nagasawa et al.

FOREIGN PATENT DOCUMENTS

| CN | 214942836 U | * | 11/2021 | |
| DE | 202016100791 U1 | * | 6/2017 | ............. B65D 19/42 |
| DE | 102019104045 A1 | | 8/2020 | |

* cited by examiner

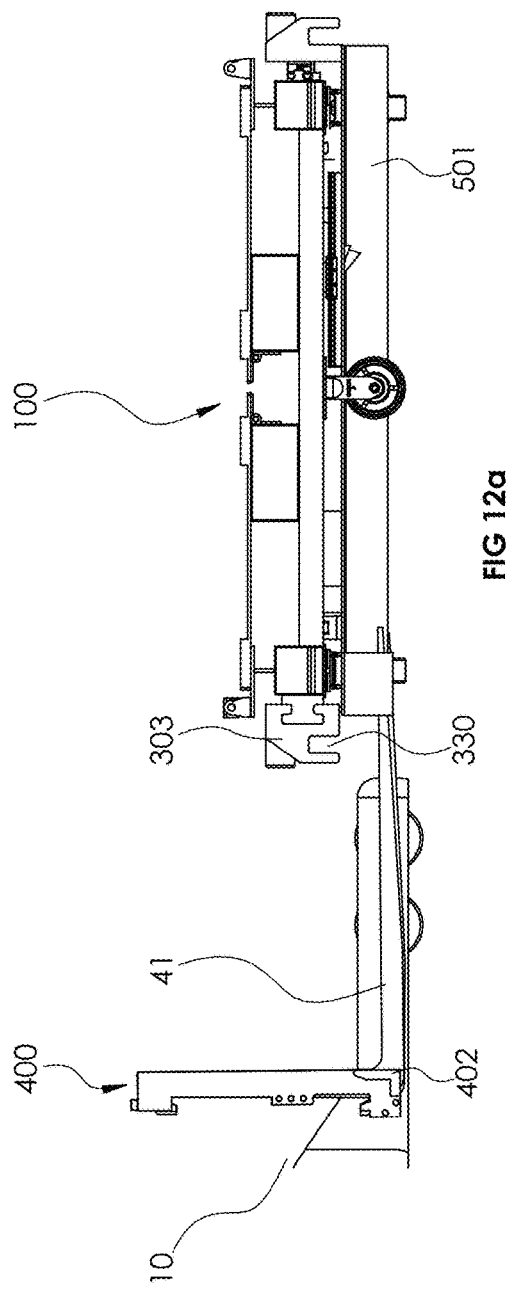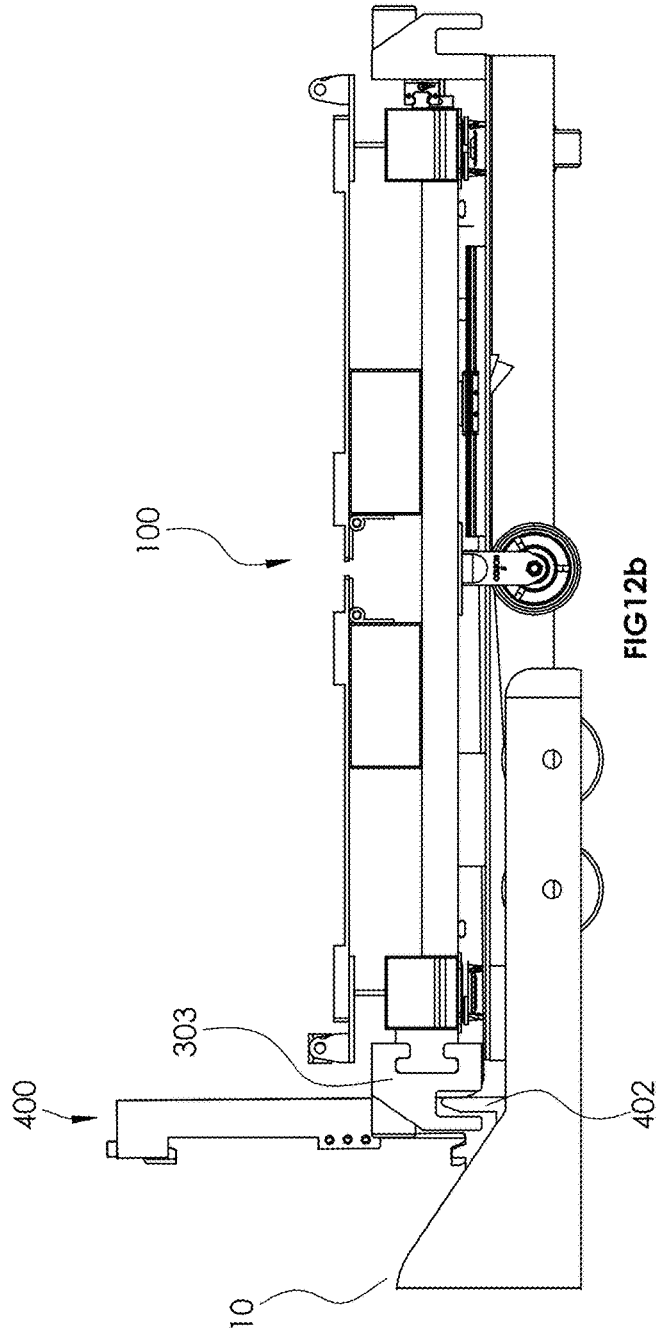

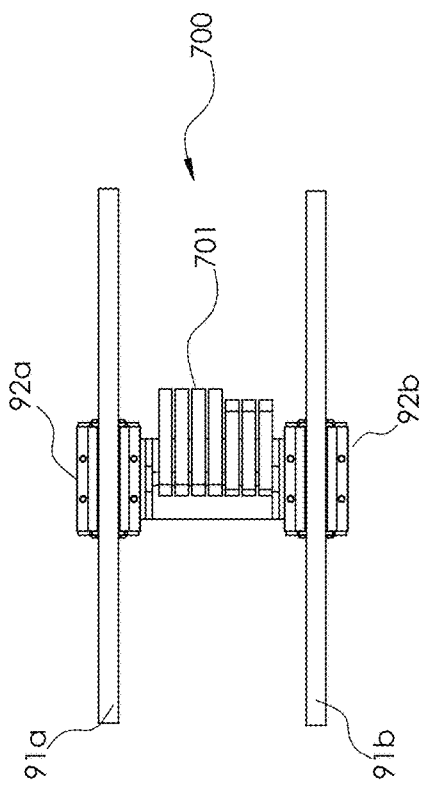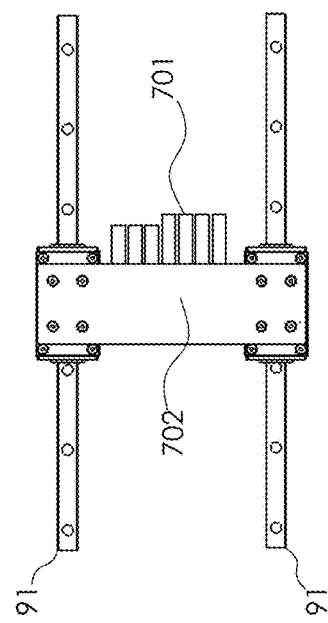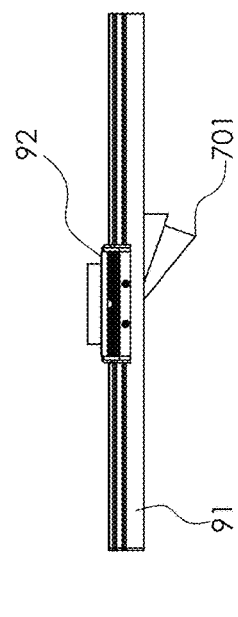
FIG 16a
FIG 16b
FIG 16c

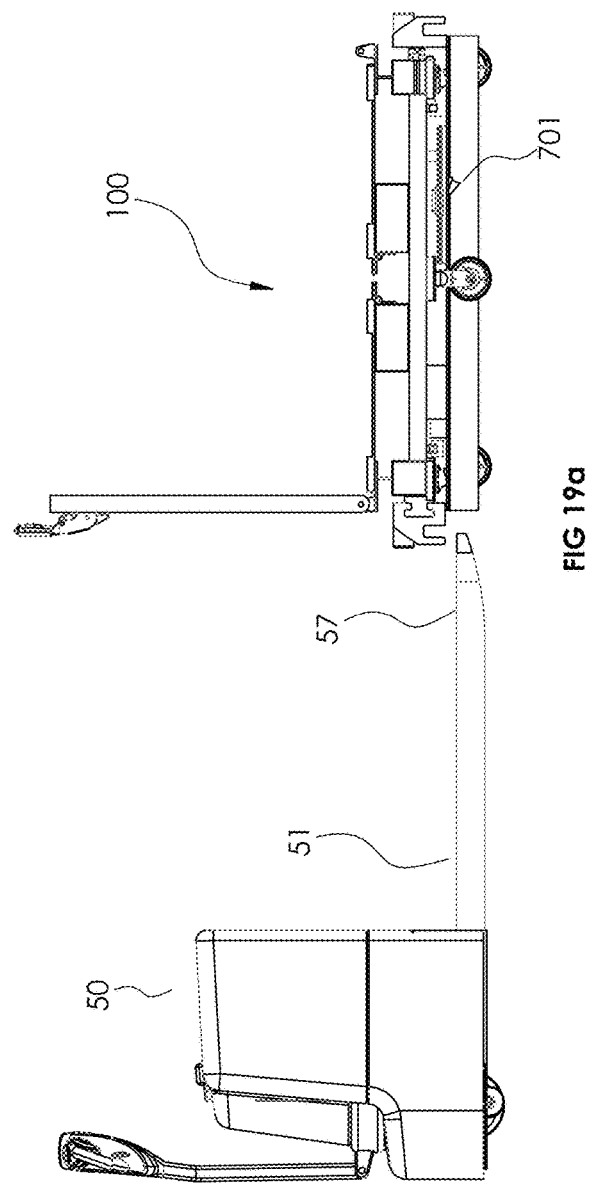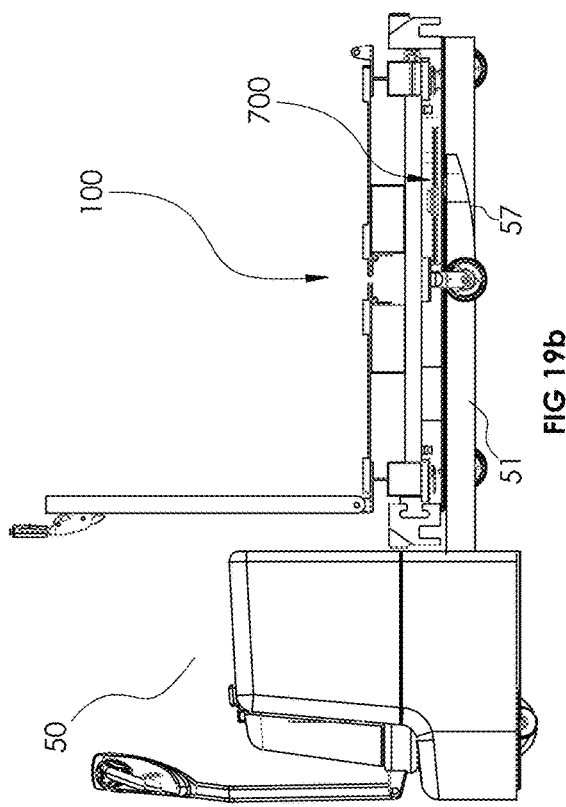

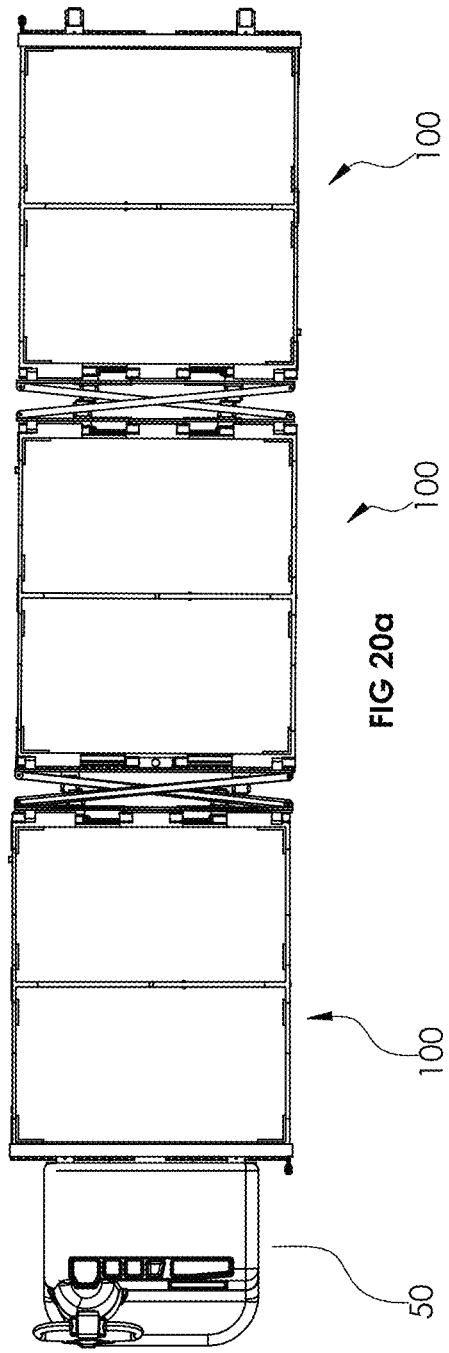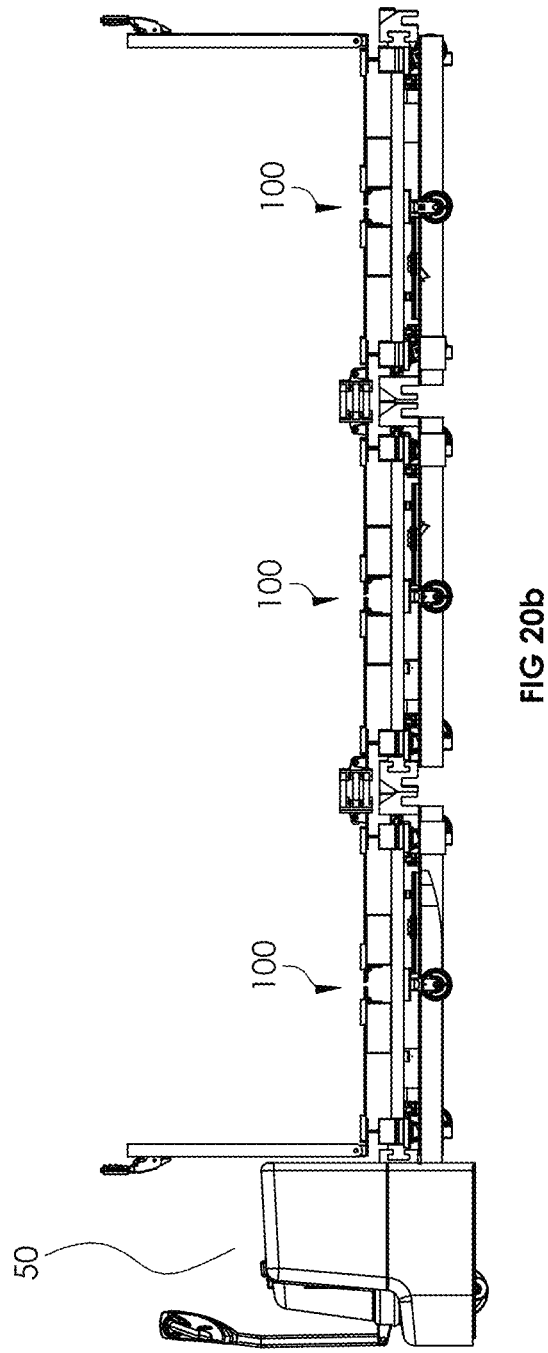

QUICK CONNECT LOGISTICS TRAILER

CROSS REFERENCE TO RELATED APPLICATIONS

This application claims priority to U.S. provisional application Ser. No. 63/228,192, filed on Aug. 2, 2021, and incorporated fully herein by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

The present invention relates to fork lifts, fork trucks, pallet jacks and other lifting vehicles used to retrieve articles in a warehouse, and to the logistics trailers used to move goods within warehouses. More specifically, the invention relates to a quick connect mechanism to allow a logistics trailer to be easily and quickly attached to a forklift or other lifting vehicle for towing, as well as with other logistics trailers to create a train of trailers that can be towed by a forklift.

Description of the Related Art

Modern commerce, particularly modern electronic or e-commerce, relies upon goods stored in warehouses that can be quickly and easily accessed and moved within facilities. Many modern warehouses are large facilities with rows upon rows of shelving stacked floor to ceiling with products. According to industry reports, the size of the average warehouse has more than doubled in the last twenty years to meet the shipping demands of e-commerce. Modern warehouses have rows upon rows of shelves that rise over 30 feet in height, and that have narrow aisles between the rows to maximize storage space within the warehouse.

Typically, in companies where there is a material delivery system based on routes, forklifts are used to remove goods that are located on the shelves, and to place those goods onto a trailer. The term forklift is a general term and includes a wide variety of vehicles with forks on the front that are raised and lowered to moved goods located on raised surfaces. This includes fork truck, stackers, and reach trucks. It also includes hand trucks and walk behind and rider electric pallet jacks, which do not reach pallets or goods on high shelves, but are used to move them between lower shelves and onto and off of transportation trailers in the warehouse. The term forklift used herein refers to vehicles fitted with forks to move materials stored on pallets. There are different kinds of forklift trucks, but the most commonly used in warehouses are Class II forklifts, which can be either sit-down or stand-on trucks, or walk behind fork trucks or electric pallet jacks. Class II forklifts are electric, narrow aisle models, and are designed with maneuverability that allows them to operate in tight spaces and narrow aisles. A typical prior art fork lift truck is shown in U.S. Pat. No. 6,182,797. This is a small, stand-on style forklift typically used in confined spaces such as a warehouse. These are also known as reach trucks, which are forklifts used in narrow aisle applications, such as warehouses. They are designed to have two outer legs that help distribute the load and a single set of wheels in the back. The wheels are located below the operator, which helps create a tighter turn radius. Typically, fork trucks have a carriage on the front that is used to attach components, what pallet jacks do not. The dimensions of the carriage and weight capacity define the classes. The carriage is used to mount objects, including forks, the load backrest, and attachments, to the mast channel, allowing loads to go up and down the mast channel. The horizontal separation distance between forks on the front of these forklifts can be increased or decreased by sliding them across the top and bottom channels on the carriage.

Currently in many warehouses and industrial facilities, there is a logistics train that is comprised of numerous trailers that is pulled by a tugger vehicle. These trains are normally parked in the cross aisles, and a forklift must go into the storage aisles to remove a load from a shelf, and then deliver the load on to the logistics train. This means that, in general, there is a need for two vehicles and two operators to move loads and packages in this process. There is a need, therefor, for a system that allows a forklift to retrieve loads from the shelves, load them onto trailers, and then pull the train of trailers to the next stop.

In a typical warehouse, virtually every item is loaded onto pallets and then stored on the shelves on the pallets. That means that the forklift is lifting a palletized load and not sliding under actual items. This makes it easier to move loads, but also ensures that stored items are not damaged by the forks of the forklift. It is common practice to load all kinds of parcels onto pallets even if they will be moved by something different than a forklift later. The primary mode of transportation in a warehouse is on forks. Items are placed onto the shelves by the forklifts, and then later removed from the shelves by the forklifts. That means a fork truck is very likely to be used at several stages of the process, while tuggers are only used to tow loads that have already been placed on trailers. This also means that it is normally necessary to have one fork truck operator retrieving loads from shelves and placing them on a tugger train that will be driven by another operator to the next destination where a fork truck will be needed again to unload the train. This adds time when multiple stops are performed and the tugger operator has to wait for a fork truck operator to load/unload materials. As a result, it would be beneficial to have a means to attach the forklift to the logistics trailer to move the trailer within the warehouse eliminating the need of a tugger and an extra operator.

SUMMARY OF THE INVENTION

The invention consists of an add-on fork guide with attachment components that are attached to a trailer to allow the forklift or pallet jack to temporarily but securely attach to the trailer to be able to pull the trailer. The components are configured to create a connection that is strong enough to allow the forklift or pallet jack to pull not just a single trailer, but a group of trailers in a logistics train. The trailer add-ons include a pair of adjustable fork guides under the trailer that pair with the blades of the forklift or pallet jack, a guide spacer assembly that can adjust the spacing of the fork guides so that they can be moved to align with the blades, a pair of adjustable magnets to provide magnetic connection to help secure the fork guides and trailer to the blades, and a pair of linear latches that mate with a cut-out in the blades of pallet jacks. The invention also includes a pair of fork retainers that are removably attached to the fork guides when the trailer is used with a forklift. The invention further includes a trailer clip assembly that is attached to the trailer when used with a forklift, and a truck clip assembly that is added to the forklift, and that attaches to the trailer clip assembly to securely connect the trailer to the forklift. This attachment is strong enough to allow the forklift to pull a number of attached trailers in a trailer train. This can eliminate the need for a separate tower or tug vehicle to a trailer or train of connected trailers.

The fork truck clip assembly is removably mounted on the carriage of the forklift along with the forks and is disposed around the shank of the fork. It includes an L-shaped clip that is positioned next to the blade where it meets the shank of the fork. The trailer clip assembly is mounted on the front of the trailer next to fork guides so that when the blades of the forks are inserted into the fork guides and the forklift moved forward the L-shaped clip will be positioned to attach to the trailer clip assembly. When the forks are lifted the L-shaped clip slides into a recess within the trailer clip assembly. This will hold the trailer in position on the forklift, so that when the forklift moves the trailer will move with it.

The invention consists of a quick connect logistics trailer used in conjunction with a forked vehicle. It comprises a trailer having a frame consisting of a front square tube and a back square tube, and a left side rail and right side rail attached between the front square tube and back square tube, and wherein said frame has a top side and a bottom side. There are two fork pockets mounted on said top side of said frame by attaching to the left side rail and right side rail, two top platform sheets attached to the two fork pockets by means of a hinge that allows each of the two top platform sheets to be folded up, and wherein, when folded down said two top platform sheets create a flat surface to place loads. There are four wheels mounted to said bottom side of said frame. There are two fork guides movably mounted on said bottom side of said frame by means of two movable linear carriages attached to the fork guides and movably mounted on two liner rails mounted between said right side rail and said left side rail, wherein said fork guides are configured to accommodate a pair of fork blades attached to said forked vehicle. And there is an attachment mechanism to removably and securely attach said quick connect logistics trailer to said forked vehicle to allow said forked vehicle to tow said quick connect logistics trailer. There is also a spacer assembly mounted to said two fork guides, wherein said spacer assembly moves the two fork guides to align them with the forks of the forked vehicle. The space assembly comprises a rod with a threaded section; two racers, each having a mounted bearing threadably attached to said threaded section of said rod; two pairs of spacer arms attached between each of said spacers and each of said two fork guides; and wherein, when said rod is turned said racers move and thereby move said pairs of spacer arms to adjust the spacing of said fork guides. In one embodiment the forked vehicle is a forklift having two forks each having a shank and a forward protruding fork blade. In this embodiment the attachment mechanism consists of a fork truck clip removably and securely attached to said forklift adjacent to said blades; and a trailer clip assembly removably and securely attached to said quick connect logistics trailer such that when said blades are inserted into said fork guides the fork truck clip attaches to said trailer clip to create a temporary and secure attachment between said trailer and said forklift, whereby said forklift can tow said trailer. In this embodiment multiple trailers can be attached in series with said quick connect logistics trailer to create a logistic trailer train. Additionally, in this embodiment, the fork truck clip assembly consists of two side walls connected by a back bracket and a bottom bracket, and two L-shaped clips located on a bottom of said side walls; said trailer clip assembly consists of a grooved bar with notches attached to a front side of said frame of said quick connect logistics trailer, and a trailer clip removably attached to said grooved bar with notches, said trailer clip having an inverted U-shaped connection slot; wherein said L-shaped clips insert into said inverted U-shaped connection slots to temporarily and securely attach said fork truck clip assembly to said trailer clip assembly, and thereby temporarily and securely attach said quick connect logistics trailer to said forklift to allow said forklift to tow said quick connect logistics trailer. In a second embodiment the forked vehicle is a pallet jack having two forward protruding fork blades, each fork blade having a forward cut-out. In this embodiment the attachment mechanism consists of two linear latches attached to each of the two fork guides, each linear latch having a multiplicity of blades that insert into each of the forward cut-outs to secure said fork blade within said fork guides; two switchable magnets attached to each of the two fork guides, wherein each of said two switchable magnets are activated to magnetically attach said fork guides to said fork blades; thereby securing said fork blades within said fork guide and thus securing said quick connect logistics trailer to said pallet jack to allow said pallet jack to tow said quick connect trailer. It is also possible in this embodiment for multiple trailers to be attached in series with said quick connect logistics trailer to create a logistic trailer train.

BRIEF DESCRIPTION OF THE DRAWINGS

FIG. 12a is a side view of the forklift with the forks in the fork guides and in position to attach the trailer clip to the fork truck clip.

FIG. 12b is a side view of the forklift with the fork truck clip inserted into the trailer clip.

FIG. 16 are views of the linear latch, with FIG. 16a a bottom view, FIG. 16b a top view, and FIG. 16c a side view thereof.

FIG. 19a is a side view of a pallet jack with the forks aligned with the fork guides of the trailer and in position to attach to the trailer.

FIG. 19b is a side view of the pallet jack fully inserted into the fork guide and attached to the trailer.

FIG. 20a is a top view of a pallet jack attached to multiple trailers to create a logistics train, and FIG. 20b is a side view thereof.

DETAILED DESCRIPTION OF THE INVENTION

Detailed embodiments of the present invention are disclosed herein. It is to be understood that the disclosed embodiments are merely exemplary of the invention, and that there may be a variety of other alternate embodiments. The figures are not necessarily to scale, and some features may be exaggerated or minimized to show details of particular components. Therefore, specified structural and functional details disclosed herein are not to be interpreted as limiting, but merely as a basis for teaching one skilled in the art to employ the varying embodiments of the present invention.

Figure 1:
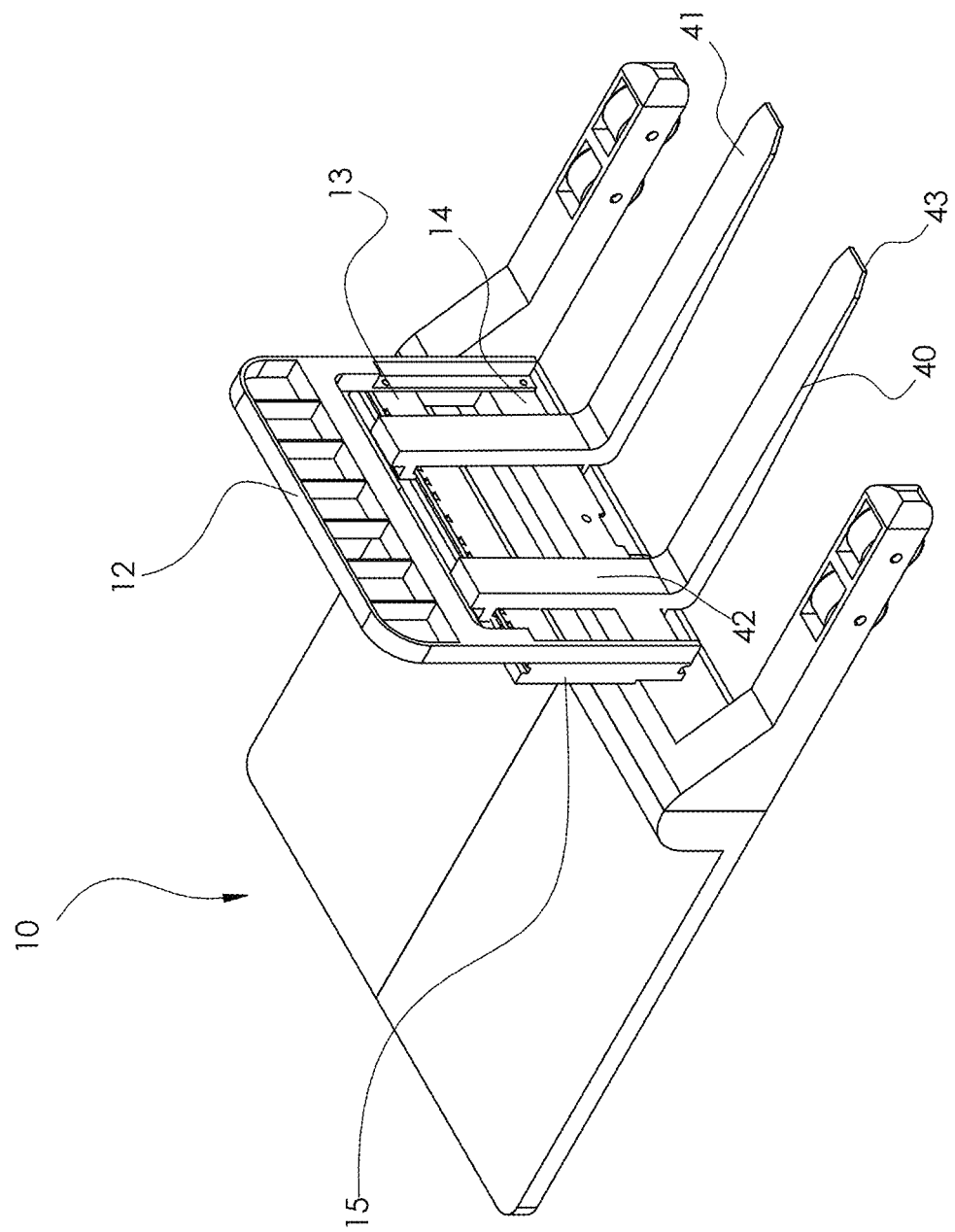
FIG. 1 is a perspective view of a representative forklift.

FIG. 1 is a perspective view of a forklift 10. As noted above, there are a wide variety of forklifts, and the invention described herein is designed to be used with any available forklift or pallet jack, but is specifically configured for smaller forklift and pallet jacks typically used in a warehouse. The drive and control portion of the forklift can vary greatly, but the main operative portions of the forklift, and the portions that relate to this invention, are essentially the same. This includes the forks 40 and the mast or mast chain, and the carriage 15 and attached components that are raised and lower on the mast. These standard components are well known in the art, and only described herein to define the invention. The forklift 10 embodiment shown in FIG. 1 includes the load back rest 12 which is a frame attached to the carriage 15 that the load on the forks 40 can rest against when be raised and lowered.

Forklifts use two forks 40, so unless specified "fork" will generally mean both forks 40 of the device. The carriage 15 is used to mount objects, including the forks 40, the load backrest 12, and other attachments. The carriage 15 includes a carriage upper bar 13 and a carriage lower bar 14. The carriage upper bar 13 includes a top rail 20 with spaced notches 22 and a carriage top channel 21 just behind the top rail 20. The top notches 22 are typically 16 mm (0.63") wide and 8 mm (0.32") deep, indented into the upper bar top rail 20 and are spaced between roughly 70 mm (2¾") and 160 mm (6⅔") apart, though actual sizes and spacing vary by lift type and manufacturer. The carriage lower bar 14 includes a bottom channel 23 that runs the length of the carriage lower bar 14. The forks 40 are attached to the carriage upper bar 13, and rest against the carriage lower bar 14. Standard forks 40 include a notched mounting clip that sits into the carriage top notches to properly space the forks 40 apart on the carriage to meet the requirements of the load to be lifted. Note that some forklifts 10 can adjust the horizontal separation of the two forks 40 by automatic means such as hydraulics or servo-motors. Standard forks 40 have a primarily horizontal blade 41, which is where loads sit, and a vertical shank 42 which includes the components to attach the forks 40 to the carriage 15. There is a tip 43, that is usually tapered at the end to allow the blade 41 to be slid under loads. There is also a top hook with a pin lock, and a bottom hook to attach the forks 40 to the carriage 15. These hooks and attachment hardware are known and not shown in the drawings. The top hook is slid into the carriage top channel 21 while the bottom hook is slid into the bottom channel 23, with the top hook placed over the upper bar top rail 20, and the pin lock is inserted into the appropriate top notch 22 to position the fork 40 and hold it into place.

The typical Class II Carriage height is 16", with a lifting capacity of between 2,200 lbs. and 5,500 lbs. The forks 40 on the lift can differ depending on the vehicle and load, but for standard warehouse forklifts the most common blade 41 length is 42-inches, the width is commonly 4-inches. Standard blades 41 are flat for most of the length, and the taper begins 16" to 24" from tip 43, and taper down from generally 2-inches to an end with a ⅜" tip. The fork spacing may vary depending on the load, and the operator can move the forks individually on the carriage. Operators have to use their judgment to adjust the fork spacing just so the load does not tip over. In general, 15 inches of spacing between internal faces of the blades 41 seems to be ideal for most loads. When changing the spacing is necessary, it can be done manually in most cases, but some trucks are fitted with hydraulic actuators (side shifters) that will space the forks in and out.

Figure 2:
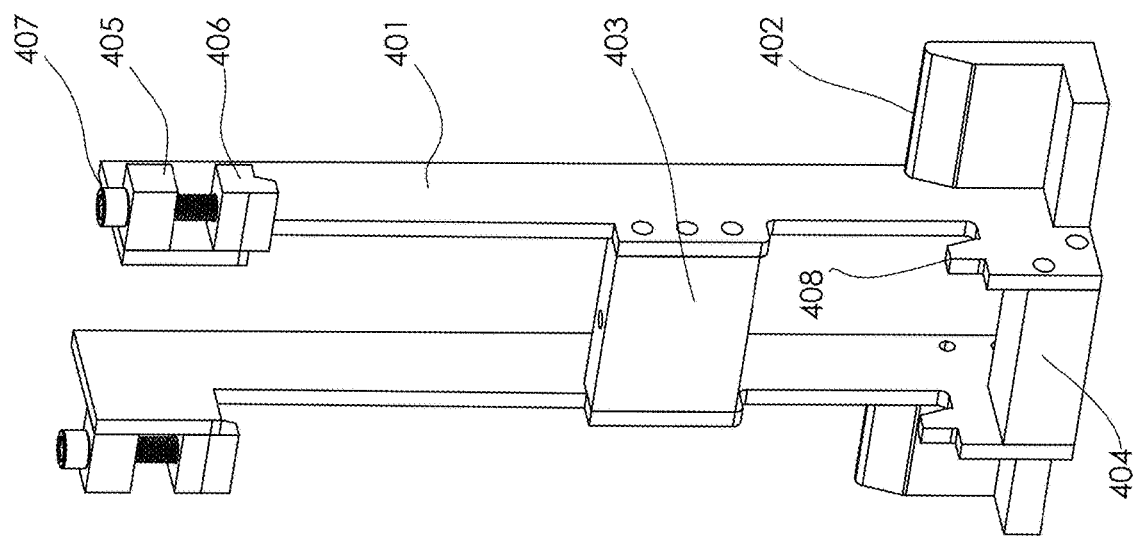
FIG. 2 is a perspective view of the truck clip assembly.

FIG. 2 is a perspective view of the truck clip assembly 400. The truck clip assembly 400 is made from two roughly "L" shaped side walls 401 that are attached roughly in the middle by the back bracket 403 and at the bottom by the bottom bracket 404 as shown, which creates a gap between the two side walls 401, and as described below this gap fits around the shank 42 of the fork 40. When in position on the carriage 15, the back bracket 403 sits on top of the carriage lower bar 14, behind the back face of the fork shank, and the bottom bracket 404 sits under the carriage lower bar 14. At the top of the two side walls 401 there are the top attachment components, which consist of the top groove latch 406, which will sit on the top rail 20 with the rear portion fitted into the carriage top channel 21, and the adjusting screw 407 which is held by the screw housing 405 as shown. The adjusting screw 407 will screw down into the top notch 22 to hold the truck clip assembly 400 in place. At the bottom of the two side walls are two L-shaped clips 402, that are attached with the face and top of the "L" against the front of the side walls 401 as shown. In the preferred embodiment these components are made from metal, typically steel, and are bolted or welded together.

Figure 3:
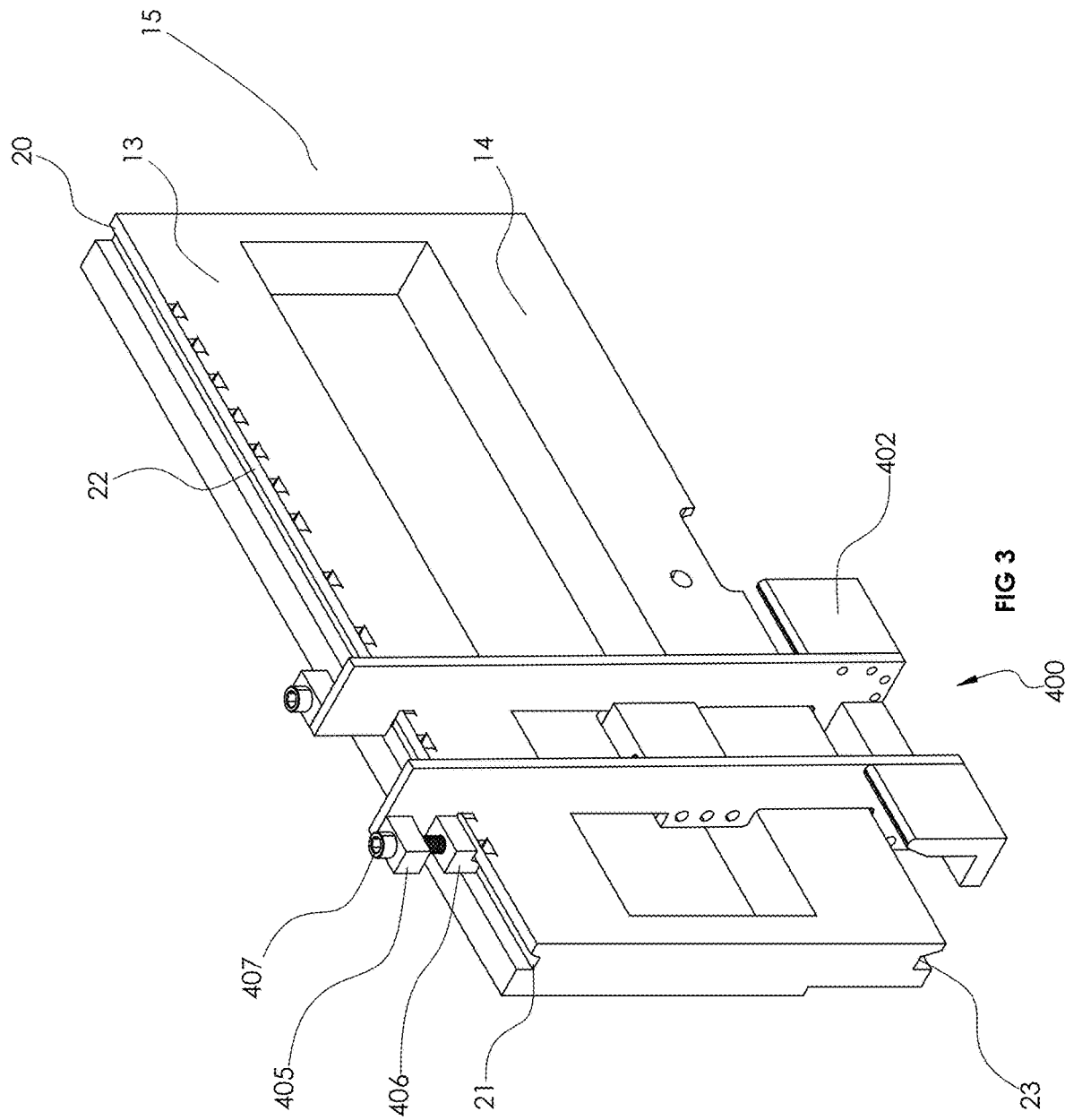
FIG. 3 is a perspective view of the carriage of the forklift with the truck clip assembly attached.
Figure 4:
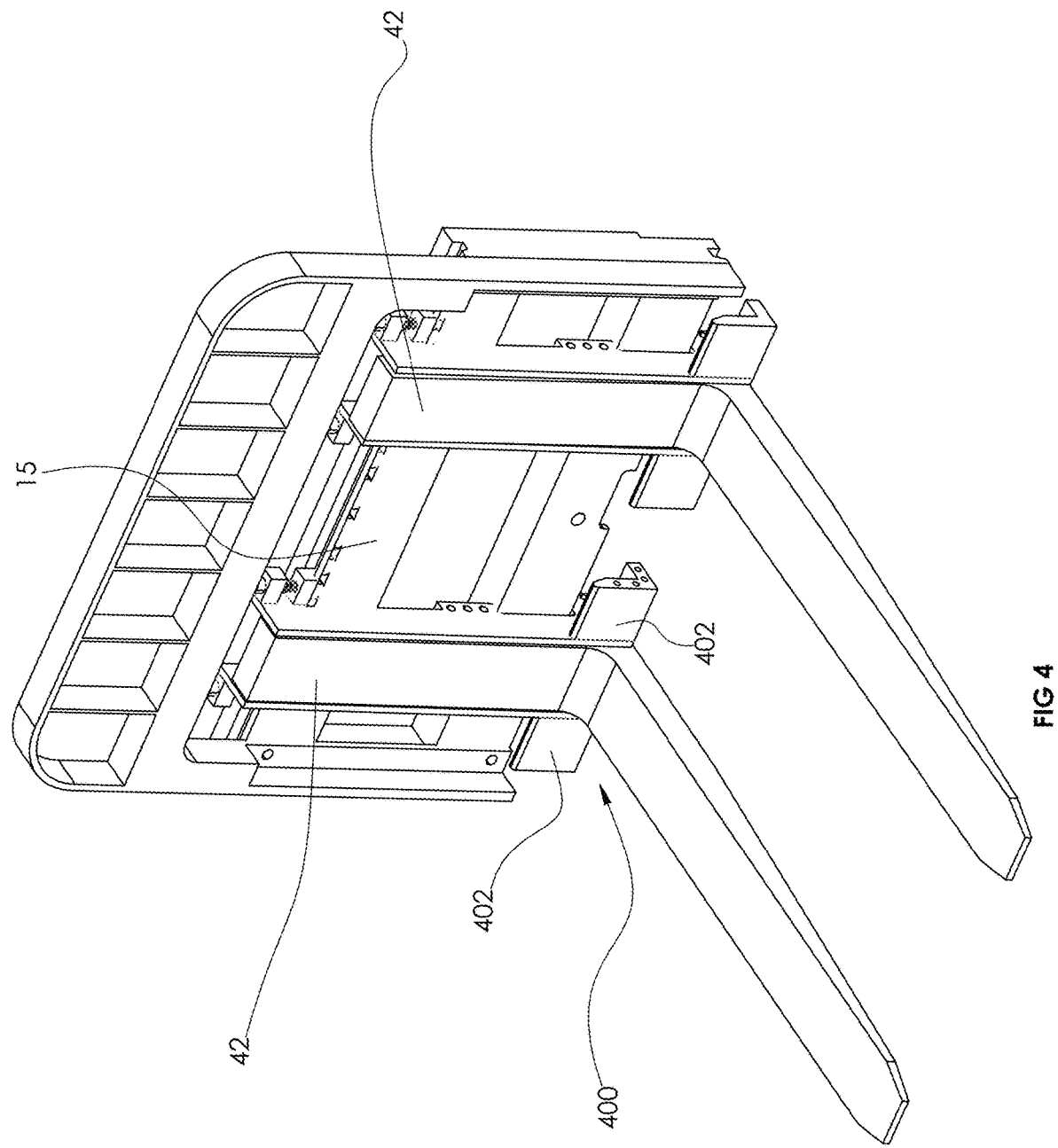
FIG. 4 is a perspective view of the truck clip assembly mounted on the front of the forklift with the blades.

FIG. 3 shows the truck clip assembly 400 attached to the carriage 15. The truck clip attachment 400 is mounted on the carriage 15 the following manner: the attachment screws 407 are driven all the way up to create clearance and the back bracket 403 is removed in preparation. With the carriage vertically parallel to the mast and lifted a couple of feet off the floor, the fork is "dressed" with the attachment, the fork will be between the attachment side walls as the attachment is moved towards the carriage. The attachment is then hung on the carriage upper bar 13 with the top groove latch 406 inserted into the top channel 21. At this point, the attachment side walls 401 are parallel to the side faces of the fork shank and the bottom notch 408 right below the carriage bottom channel 23. As the screws 407 are driven down, the distance between the screw housing 405 and the top groove latch 406 increases and raises the attachment driving the bottom groove notch into the bottom channel 23. The back bracket 403 is then installed and the attachment 400 is snuggly mounted on the carriage around the shank. The combination of the forks 40 and the truck clip assemblies 400 on the forklift 10 are shown in FIG. 4. In this configuration the truck clip assembly 400 is essentially paired with, and moves with, the fork 40.

Figure 5:
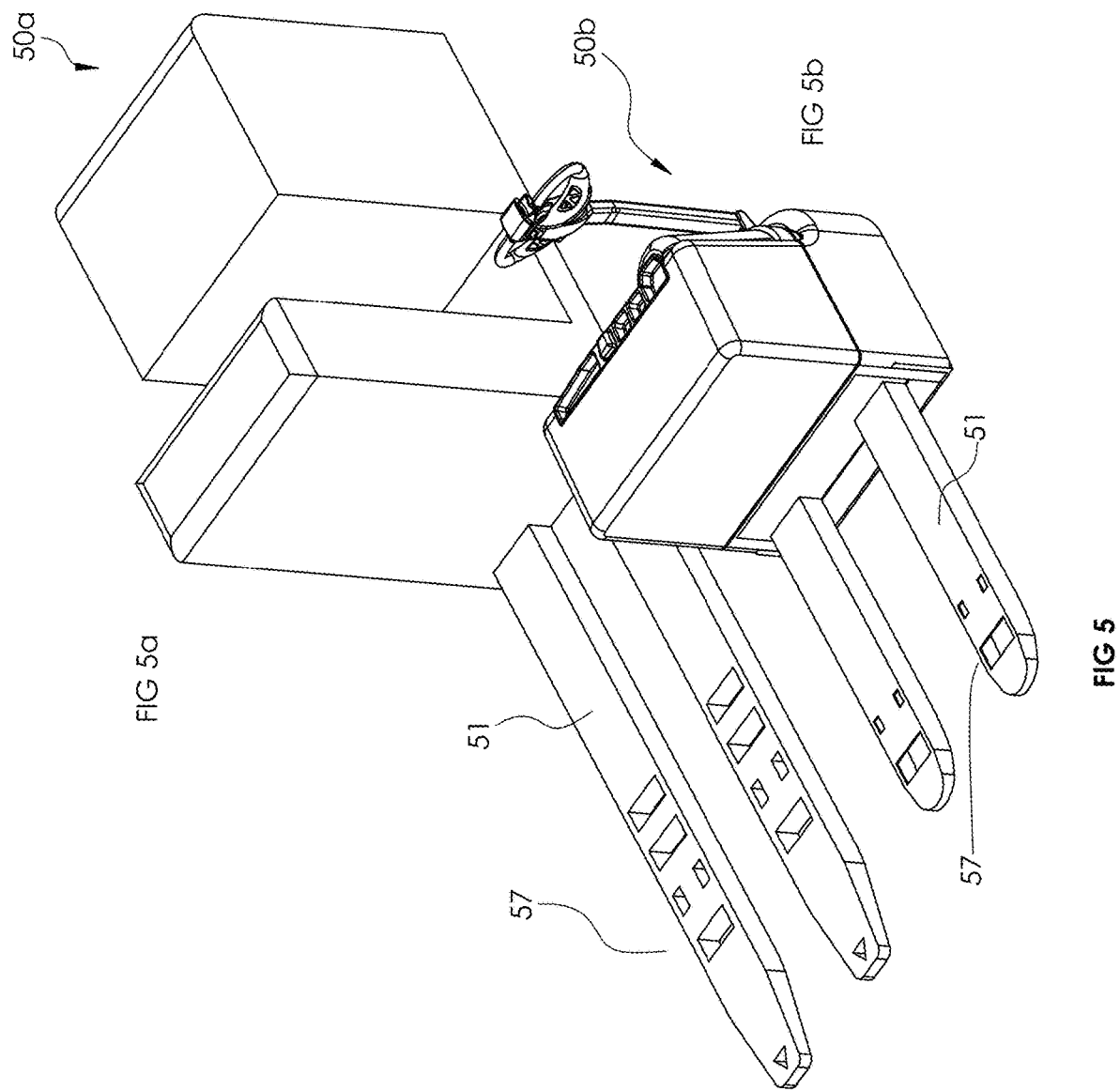
FIG. 5a is perspective views of stand-on Electric pallet jack.
FIG. 5b is a perspective view of a walk-behind electric pallet jack.

FIG. 5*a* shows a typical stand-on electric pallet jack 50*a*, and FIG. 5*b* shows a typical walk-behind pallet jack 50*b*. Pallet jacks 50*a* & 50*b* do not have a carriage 15, but have two blades 51 attached directly to the vehicle. The forks of electric pallet jacks have dual purpose. Besides raising the load off the floor, they are part of the chassis and sustain both the weight of the vehicle and the weight of the load. The forks may have several cut outs and are hollow. The sheet metal used to make both the flat surface and the walls are about 5 mm thick. The hollow enclosure houses the wheel and the mechanism that lifts the forks and the load sitting on top of them. Because pallet jacks sit closer to the ground, and because the blades 51 of the forks are also lower to the ground, there are typically wheel cut-outs 57 on the blades. When the forks are lowered in the fully down position, they are on top of the frame that holds the wheels, and so as to not conflict with the wheels, there is a cut-out 57 in the blades 51. While the cut-out 57 is typically near the front end of the blade 51 near the tip, because there are different sizes and styles of pallet jacks, the cut-outs 57 are in different positions, as noted by comparing the stand-on pallet jack of FIG. 5*a* and the walk-behind pallet jack of FIG. 5*b*.

Figure 6:
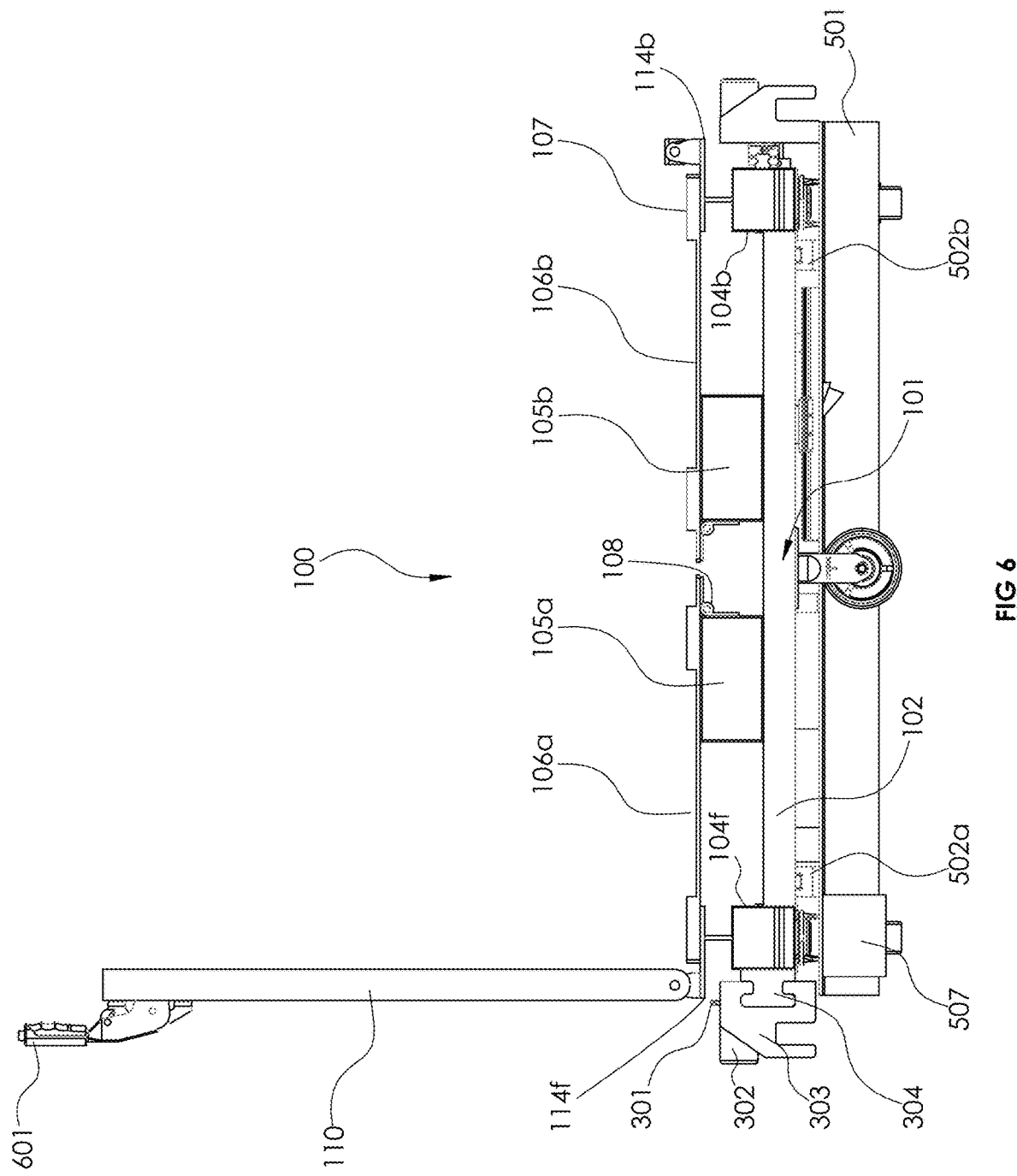
FIG. 6 is a side view of a trailer.
Figure 7:
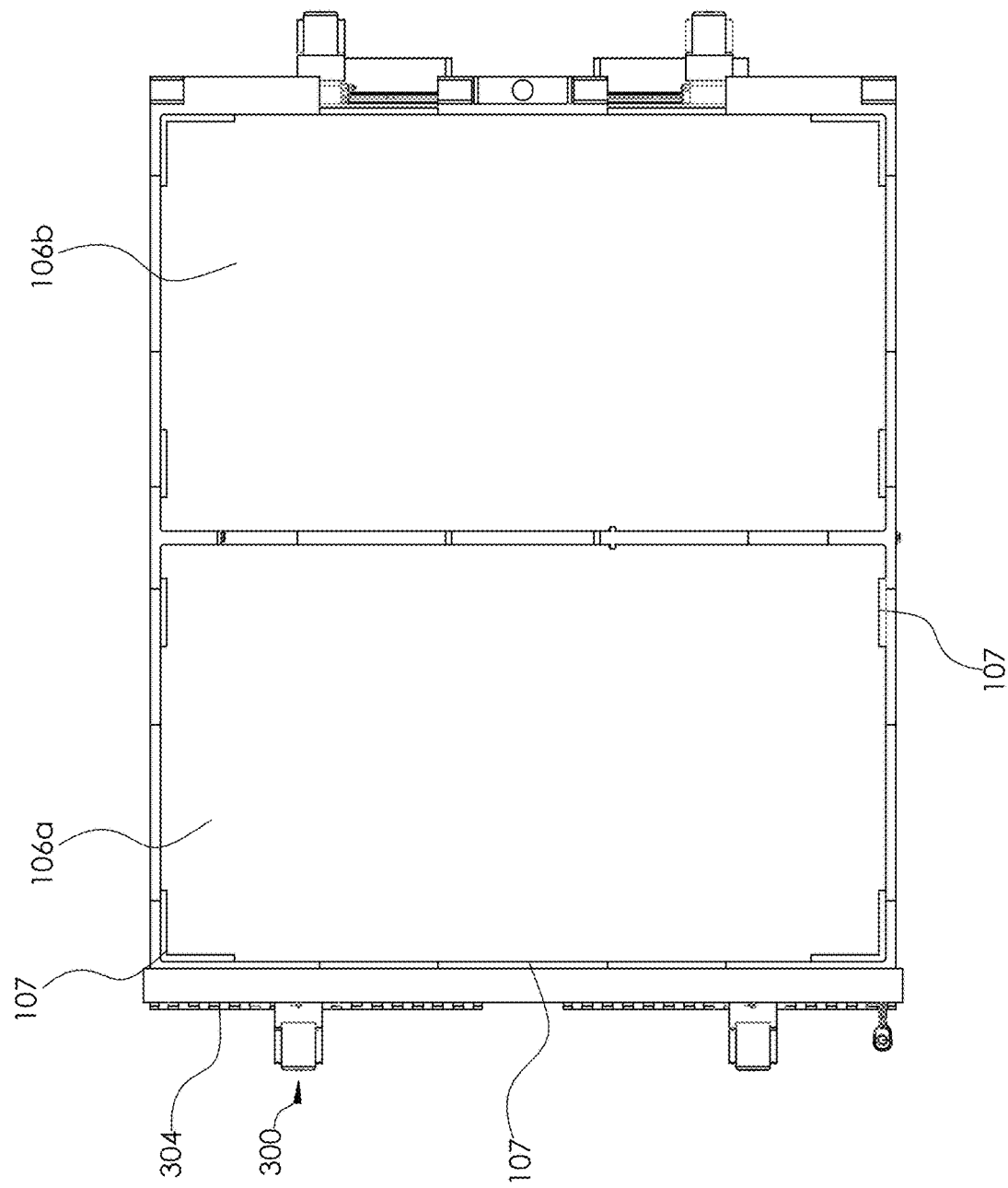
FIG. 7 is a top view of a trailer.
Figure 8:
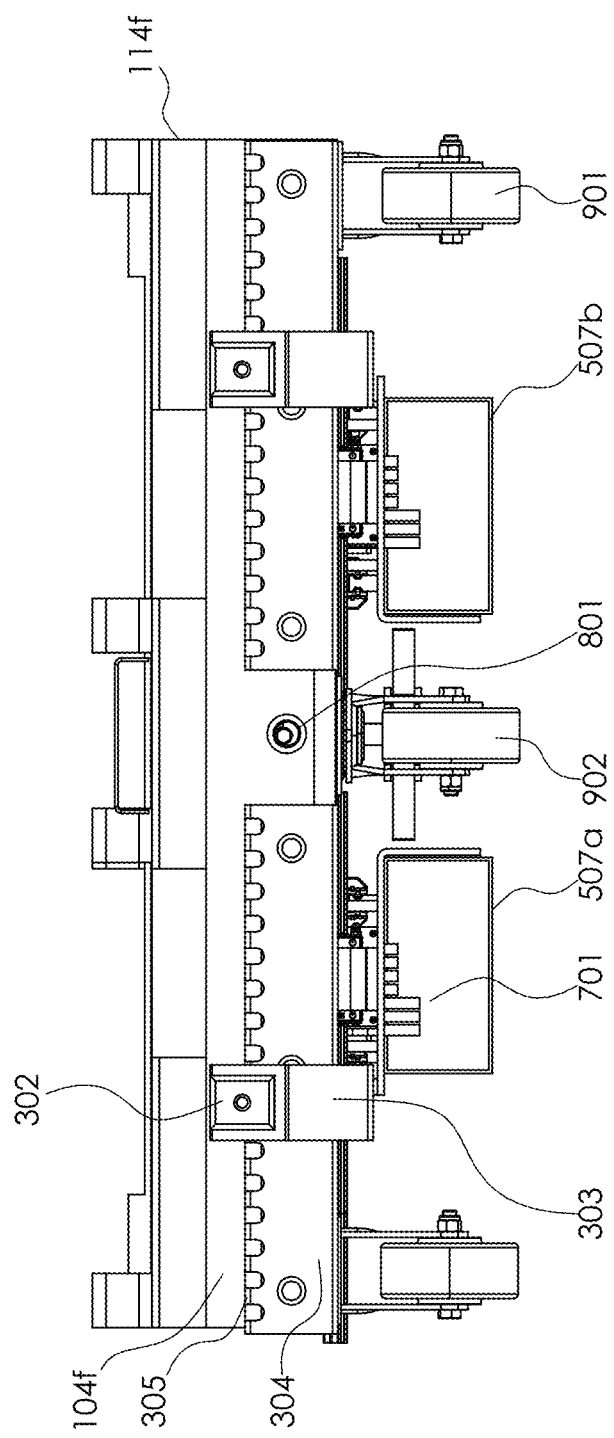
FIG. 8 is a front view of a trailer.
Figure 9:
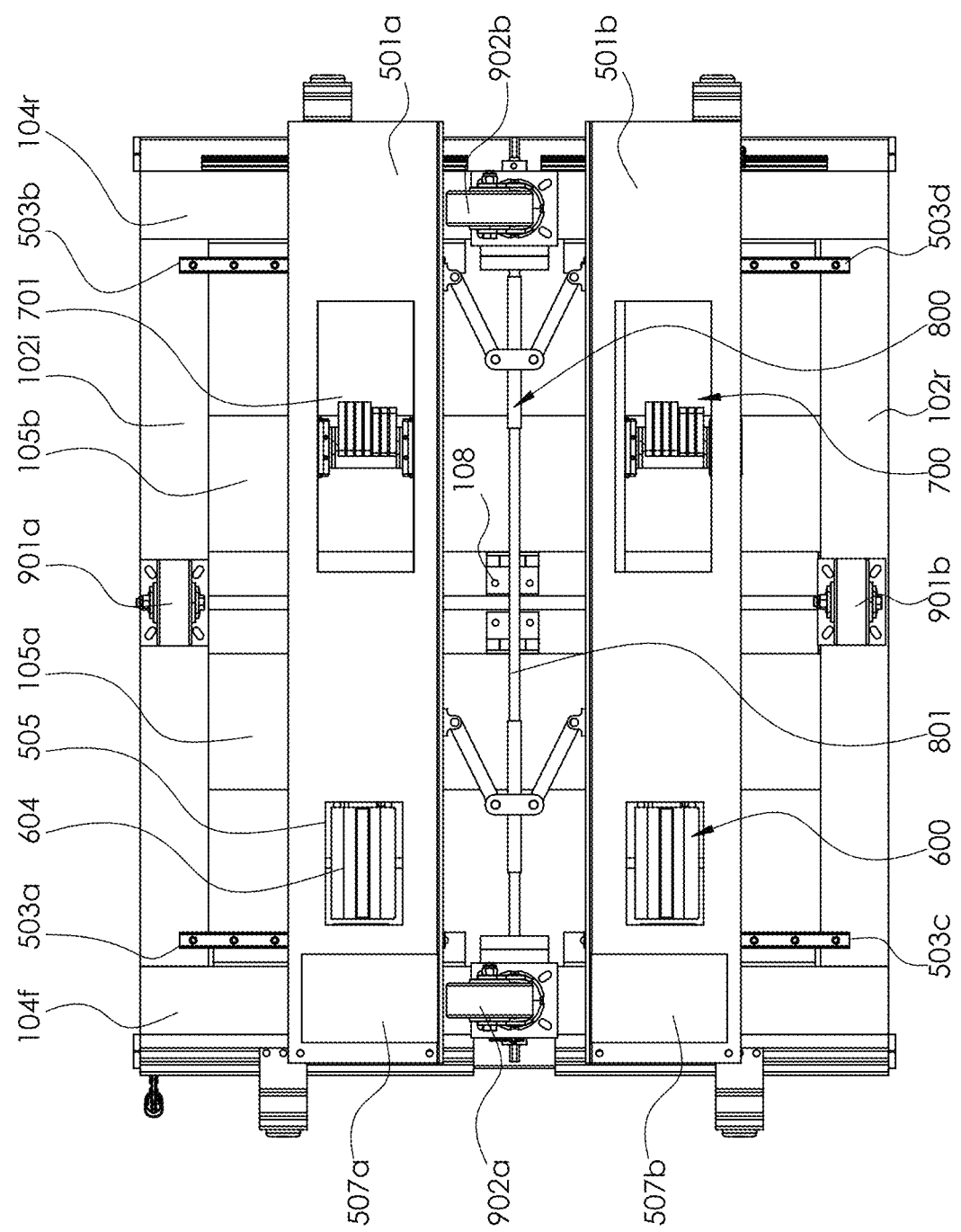
FIG. 9 is a bottom view of a trailer.

A trailer 100 is shown in FIGS. 6, 7, 8 & 9, with FIG. 6 a side view, FIG. 7 a top view, FIG. 8 a front view, and FIG. 9 a bottom view. There are a wide variety of trailers that are used with forklifts to transport goods in warehouses, and in the preferred embodiment a fairly standard warehouse trailer will be modified by the addition of a few components to make it work as part of this invention. The trailer 100 has a rectangular frame 101, which is conventionally made of a light weight but strong and durable metal such as aluminum or steel. In the preferred embodiment the frame 101 is made of rectangular steel tubing and configured in a rectangular pattern, which is best seen from the bottom view in FIG. 9. The frame 101 is made of a front square tube 104*f*, a back square tube 104*b*, a left side rail 102*l*, and a right side rail 102*r*, with the side rails 102*l* and 102*r* generally longer than the front and back tubes 104*f* and 104*b* so the trailer 100 is longer than wide. A standard warehouse trailer is typically 1540 mm (60.63 inches) long and 1100 mm (43.3 inches) wide, though the dimensions can vary and the operation of the present invention do not depend upon the size of the trailer. The front and back square tubes 104*f* and 104*b* are the same, and the left and right side rails 102*l* and 102*r* are the same. When the trailer 100 is towed, it is moved from front to back. The four sides of the frame are welded together, but can be attached by bolts or other known methods of attachment. The typical trailer is sized to accommodate a standard warehouse pallet, which comes in different sizes, the most common being 48"×40", 42"×42", and 48"×48".

The frame 101 has a top side and a bottom side, with the components used to hold the loads located on the top side, and the components to interact with the blades 41 (or 51) located on the bottom or underside of the frame. On the top side of the frame, attached to front platform sheet 106*a* is a hinged grate 110 that is typically used to protect the loads on the platform sheets 106*a* and 106*b* from the mechanisms of the forklift 10 or pallet jack 50. There is a magnet engaging lever 601 mounted on the top end of the grate, as seen in FIG. 6. This places it near the forklift 10 or pallet jack 50 operator so that the switchable magnet assembly 600 can be easily operated. The switchable magnet assembly 600 is described fully below.

In the preferred embodiment there are two fork pockets 105*a* and 105*b* mounted on the frame 101. The fork pockets 105*a* and 105*b* run side to side and so are mounted on the left and right side rails 102*l* and 102*r*. The fork pockets 105*a* and 105*b* are attached to the frame by welding, by bolts, or other conventional means. The fork pockets 105*a* and 105*b* allow the trailer 100 to be lifted by the forklift 10 on the side for maintenance and order picking. There are two flat platforms 106*a* and 106*b* that form the upper surface of the trailer 100, and upon which loads will rest. These are rotatably mounted on top of the fork pockets 105*a* and 105*b*, and which rest on their ends on the front and back platform braces 114*f* and 114*b*, that are attached to the front and back square tubes 104*f* and 104*b*. In the preferred embodiment the flat platforms 106*a* and 106*b* are made of sheet metal, but other strong and sturdy materials can be used. There are a series of raised edges 107 spaced on the outside edge of the platforms 106*a* and 106*b* to prevent pallets or other loads from slipping off of the trailer 100. These are typically 4 inches long, one inch tall and about half an inch thick. They can be made from the same material as the platforms 106*a* and 106*b*, or can be attached by screwing or welding. The platforms 106*a* and 106*b* are held in place by the fork pockets 105*a* and 105*b*, and the front and back platform braces 114*f* and 114*b* which are on the front and back square tubes 104*f* and 104*b*. The platforms 106*a* and 106*b* are attached to the fork pockets 105*a* and 105*b* by means of a platform hinge 108, with platform 106*a* on fork pocket 105*a* and platform 106*b* on fork pocket 105*b*. These hinges 108 are attached on the inside face of the fork pockets 105*a* and 105*b* so that when the platforms 106*a* and 106*b* are rotated upward they meet in the center. The platforms 106*a* and 106*b* can be raised to access the lower components of the trailer 100.

There are two L-shaped fork guides 501*a* and 501*b* mounted on the underside of the frame 101, and oriented front to back, to accommodate the blades 41 (or 51) of the forklifts 10 (or pallet jacks 50). These are movably mounted so that the spacing between the fork guides 501*a* and 501*b* can be adjusted to accommodate the potential different spacing of the fork blades 41 (or 51) of the forked vehicles (forklift 10 or pallet jack 50). There are two linear carriages 502*a* and 502*b* mounted to the front and back of the fork guides 501*a* and 501*b*, and these linear carriages 502*a* and 502*b* are movably attached to two linear rails 503*a* and 503*b*. The linear rails 503*a* and 503*b* are attached to the left side rail 102*l* and the right side rail 102*r*, near the front and back of the frame 101 as best seen in the side view of FIG. 6. The linear carriages 502*a* and 502*b* are conventional and known carriages with internal bearings that allow the carriages to slide on a rail. The conventional carriages and rails are paired so that the carriage is configured to slide easily on the rails. In one embodiment there are two removably attached fork retainers 507*a* and 507*b* bolted, or attached by machine screws, to the front of the L-shaped fork guides 501*a* and 501*b*. These fork retainers 507 are used with standard forklifts 10, but not with pallet jacks 50. The L-shaped fork guides 501*a* and 501*b* run lengthwise from the front to back of the trailer 100, and since they are movably mounted on the linear rails 502*a* and 502*b*, they can be moved in and out from the centerline of the trailer 100 to adjust the horizontal spacing to accommodate the different spacing of the blades 41 (or 51) of the lifts.

There is a guide spacer assembly 800 mounted on the bottom of the frame and attached to the fork guides 501*a* and 501*b* to adjust and control the spacing of the fork guides 501. The guide spacer assembly 800 is best seen in the bottom view of FIG. 9 and FIG. 15, and the operation of the guide spacer assembly 800 is described in detail below, but it allows for the operator to adjust the spacing of the L-shaped fork guides 501*a* and 501*b* to align with the fork blades 41 and 51. The fork retainers 507*a* and 507*b* are a removable bolted metal bands that are only used when fork trucks 10 are being used as towing vehicles for the trailer 100, and keep the trailer 100 from turning over on the fork blades 41. They are removed when pallet jacks 50 are used as towing vehicles.

There are four wheels attached to the underside of the trailer 100, as best seen in FIG. 9. There are two rigid caster wheels 901*a* and 901*b* that are on the sides of the trailer 100, mounted on the left and right side rails 102*l* and 102*r*, and which allows the trailer to be moved forward easily. There are two swivel caster wheels 902*a* and 902*b*, one on the front and the other on the back of the trailer 100, that are mounted on the front and back square tubes 104*f* and 104*b*. There are conventional caster wheel assemblies and are known in the art.

In the disclosed embodiment, and as best seen in the front view of FIG. 8, there are two grooved bars 304 attached on the front face of the front square bar 104*f*, and two grooved bars 304 attached to the front face of the back square bar 104*b* of the trailer 100. The grooved bars 304 have a series of notches 305 that are evenly spaced out along the grooved bars 304. The spacing of the notches 305 on the grooved bars allow the trailer clip assembly 300 to be adjusted in increments of 30 mm along the bar. The grooved bars 304 can easily be attached to any trailer 100, typically by means of bolts or screws, or other common attachment means. It is also possible, and within the conception of the invention, to have a single grooved bar 304 running the full front face of the front square tube 104*f* and back square tube 104*b* of the trailer 100.

Figure 11:
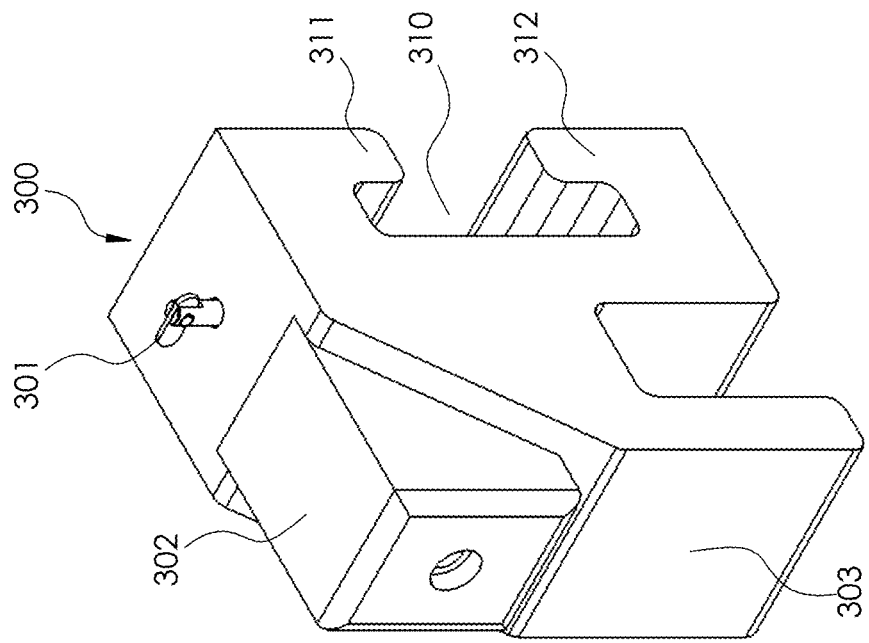
FIG. 11 is a perspective view of the trailer clip assembly with the components attached.
Figure 10:
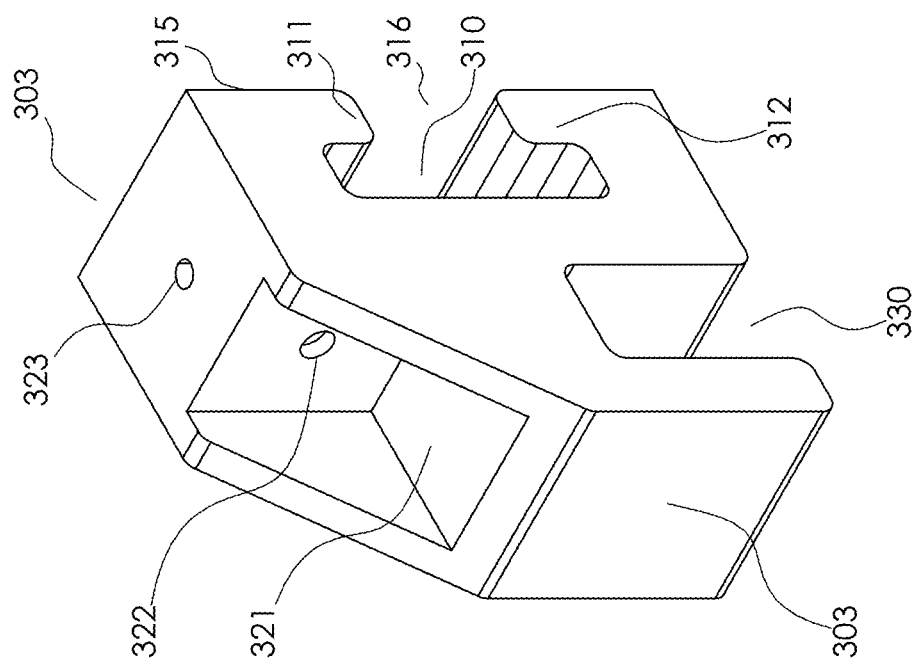
FIG. 10 is a perspective view of the trailer clip assembly without components.

FIG. 10 is a perspective view of the unassembled trailer clip assembly 300, and FIG. 11 is a perspective view of the trailer clip assembly 300 with the bumper 302 and positioning lock pin 301 in place. The trailer clip assembly 300 is a roughly rectangular block, of approximately 3.7" long and 6" tall, with the top rear edge cut off angularly and replaced with a rubberized bumper 302, a C-shaped attachment groove 310 in front, and an inverted U-shaped trailer connection slot 330 on the bottom rear. Because the trailer clip 303 attaches to a trailer 100, the front is towards the trailer 100, the rear is away from the trailer and will engage the forklift 10, the bottom is the underside, and the top is the topside. In the preferred embodiment the trailer clip assembly 300 is made from steal, or alternatively strengthened aluminum, and cut to shape. There is a bumper insert groove 321 on the upper rear of the block, and cut into the block. There is a bumper attachment hole 322 that is threaded and configured to accept a screw to secure the bumper 302 in place. The bumper 302 is a triangular piece of rubber or other suitably soft and plastic material. The C-shaped attachment groove 310 is cut into the front face 315, leaving a top lip 311 and a bottom lip 312 around an attachment opening 316. The C-shaped attachment groove is centered on the rear of the trailer clip assembly, with the opening approximately 1.8" wide and the top and bottom lip approximately 0.8 inches thick, leaving the recessed internal groove approximately 0.8" deep, which is sized to mate with the grooved bar 304 at the front of the trailer 100 as described below. There is a positioning hole 323 at the top of the block and drilled through and into the upper inside of the C-shaped attachment groove 310. A positioning lock 301, which is a pin, is inserted through the positioning hole 323. The pin will insert into a notch 305 of the grooved bar 304 to position and secure the trailer clip assembly 300 into place on the trailer 100. Positioning locks 301 are known, and this works in the conventional manner, with a spring to hold it in place. At the bottom rear of the trailer clip assembly 300 a groove is cut into the block to create the inverted U-shaped trailer connection slot 330. In the preferred embodiment the groove is cut approximately 0.8" from the rear 303 of the block and is approximately 1.4" wide and 2.5" deep. This is sized to mate with the "L" shaped clip 402 of the truck clip assembly 400 as described in more detail below. The precise sizes of the components can vary somewhat to accommodate different equipment.

The trailer clip 303 attaches to the trailer 100 by the C-shaped attachment groove 310 which is sized and configured to slide onto the grooved bars 304, with the grooved bar 304 sliding into the C-shaped groove 310 with the top lip 311 and bottom lip 312 behind the grooved bar 304, and then secured in place by means of the positioning lock 301. This leaves the trailer connection slot 330 positioned on the front of the trailer 100 and with the U-shaped connection slot 330 on the bottom. There are two trailer clips 300*a* and 300*b* that are positioned on the grooved bars 304 on either side of the fork guides 501*a* and 501*b* so that they will align with the upwardly facing component of the L-shaped clips 402.

Figure 13C:
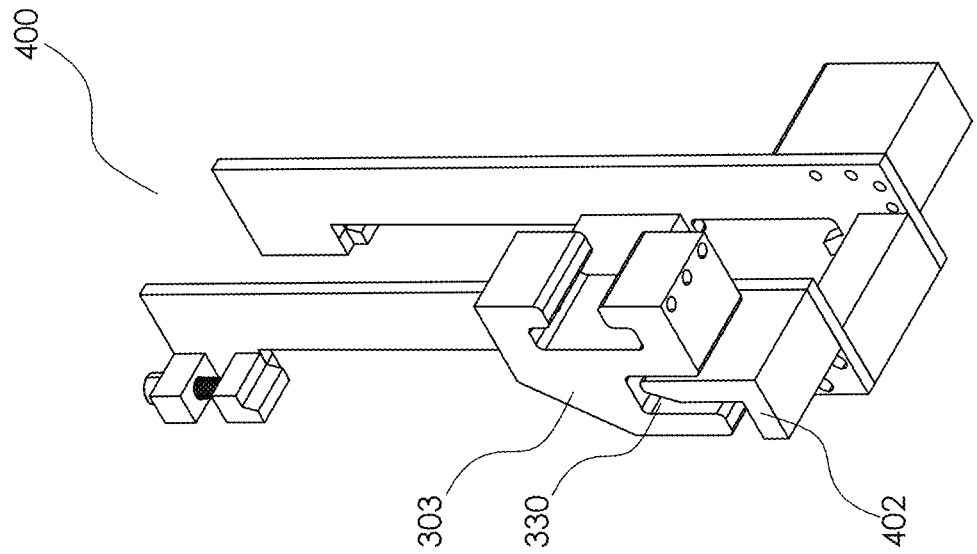
FIG. 13c is an isolated perspective view of the fork truck clip inserted into the trailer clip.
Figure 13B:
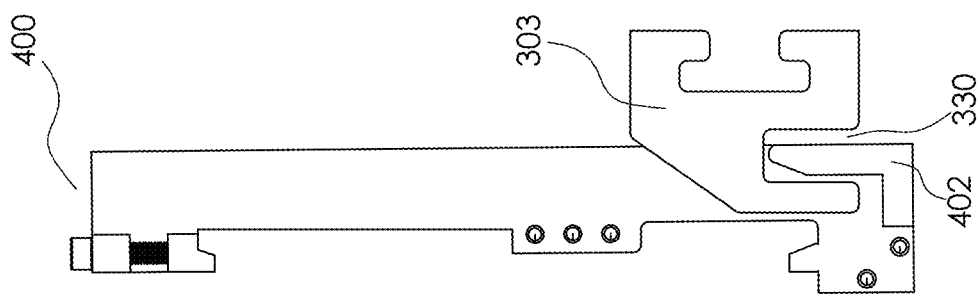
FIG. 13b is an isolated side view of the fork truck clip inserted into the trailer clip.
Figure 13A:
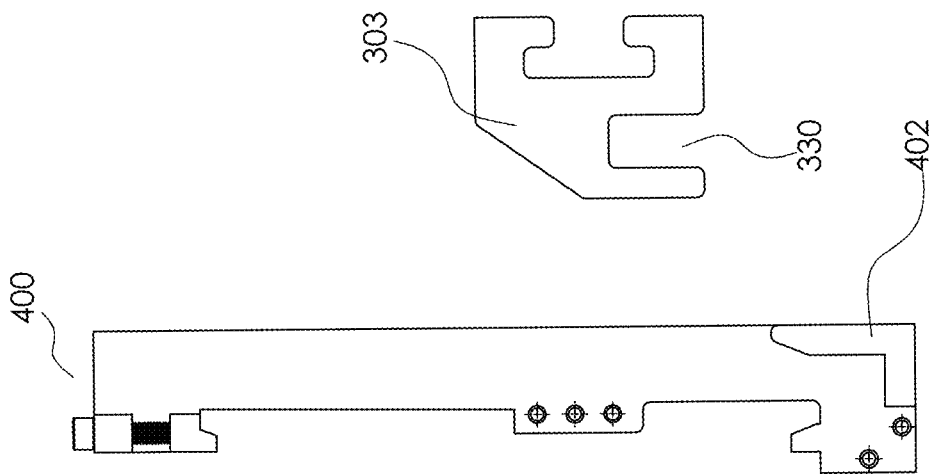
FIG. 13a is an isolated side view of the fork truck clip near the trailer clip to be attached.

To attach the forklift 10 to the trailer 100, the forklift is positioned so that the blades 41 are inserted into the fork retainers 507, and the forklift 10 is driven slowly forward, sliding the blades 41 into and along the fork guides 501*a* and 501*b*, and continuing forward until the bumpers 302 are against the carriage 15, when the forklift 10 will be stopped. The forklift operator will do this slowly and carefully. Once the blades 41 are fully in, the L-shaped clip 402 will be placed directly under the trailer connection slot 330, and then the blades 41 will be raised slowly and carefully, and the L-shaped clips 402 will slide into the trailer connection slot 330 to secure the trailer 100. The L-shaped clips 402 have a slight bevel of the top edge which allows L-shaped clips 402 to slide in even if not exactly aligned under the connection slot 330. FIG. 12*a* shows the forklift 10 with the blades 41 inserted into the fork retainers 507 and ready to attach. FIG. 12*b* shows that the forklift 10 has moved forward to the point where the bumper 302 touches the carriage and the blade 41 has been lifted, inserting the L-shaped clip 402 into the trailer connection slot 330. FIG. 13*a* is an isolated side view showing just the fork truck clip assembly 400 and its components, particularly the L-shaped clip 402, in position near the trailer clip assembly 300, showing the connection slot 330. FIG. 13*b* is a side view with the L-shaped clip 402 inserted into the connection slot 330, and the trailer clip assembly 300 attached to the fork truck clip assembly 400. FIG. 13*c* is a perspective view of the L-shaped clip 402 inserted into the connection slot 330, and the trailer clip assembly 300 attached to the fork truck clip assembly 400.

Figure 14A:
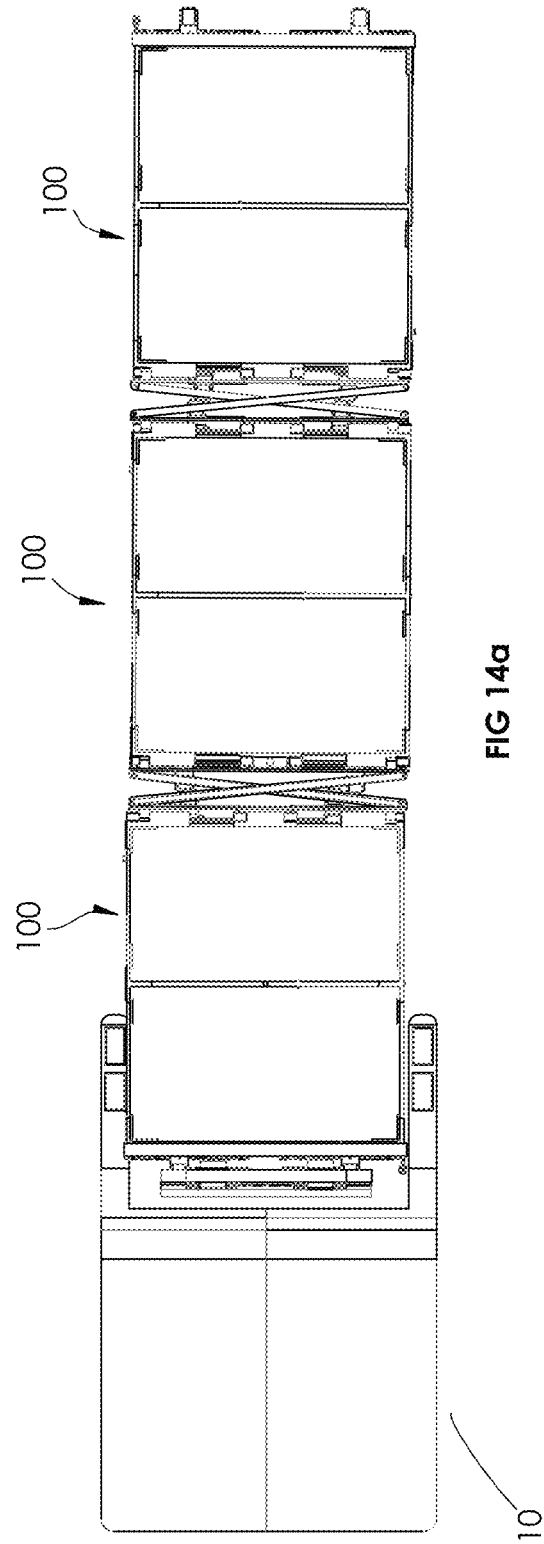
FIG. 14 are views of a forklift attached to multiple trailers to create a logistics train, with FIG. 14a a top view and FIG. 14b a side view.
Figure 14B:
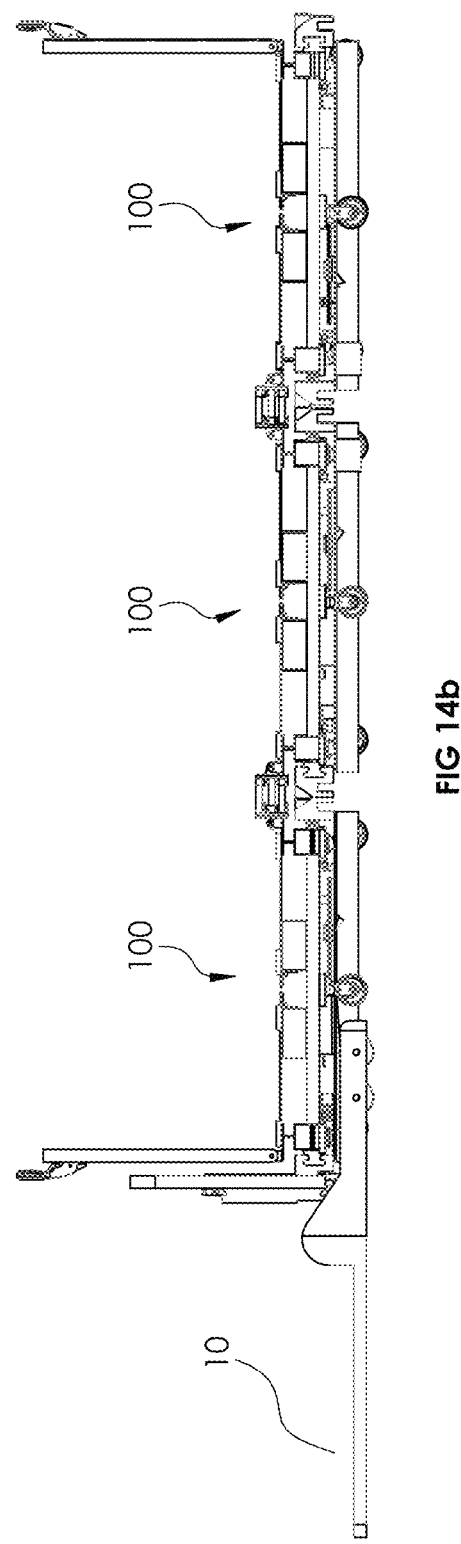

It is common in warehouses for numerous trailers 100 to be attached to create a logistics train. These are commonly attached by conventional drawbars with hitches. FIG. 14 shows the forklift 10 attached to three trailers 100. FIG. 14a is a top view, FIG. 14b is a side view, and FIG. 14c is an underside view of the forklift 10 attached to three trailers 100 to create a logistics train. The attachment created by the connection between the trailer clip assembly 300 and the fork truck clip assembly 400 is strong and secure enough so that the forklift 10 can now be used as the tugger to pull numerous trailers 100 in a train. This allows the forklift driver to tow the logistics train loaded with goods to the distribution point, and then detach from the first trailer 100 and unload all of the trailers 100.

Figure 15:
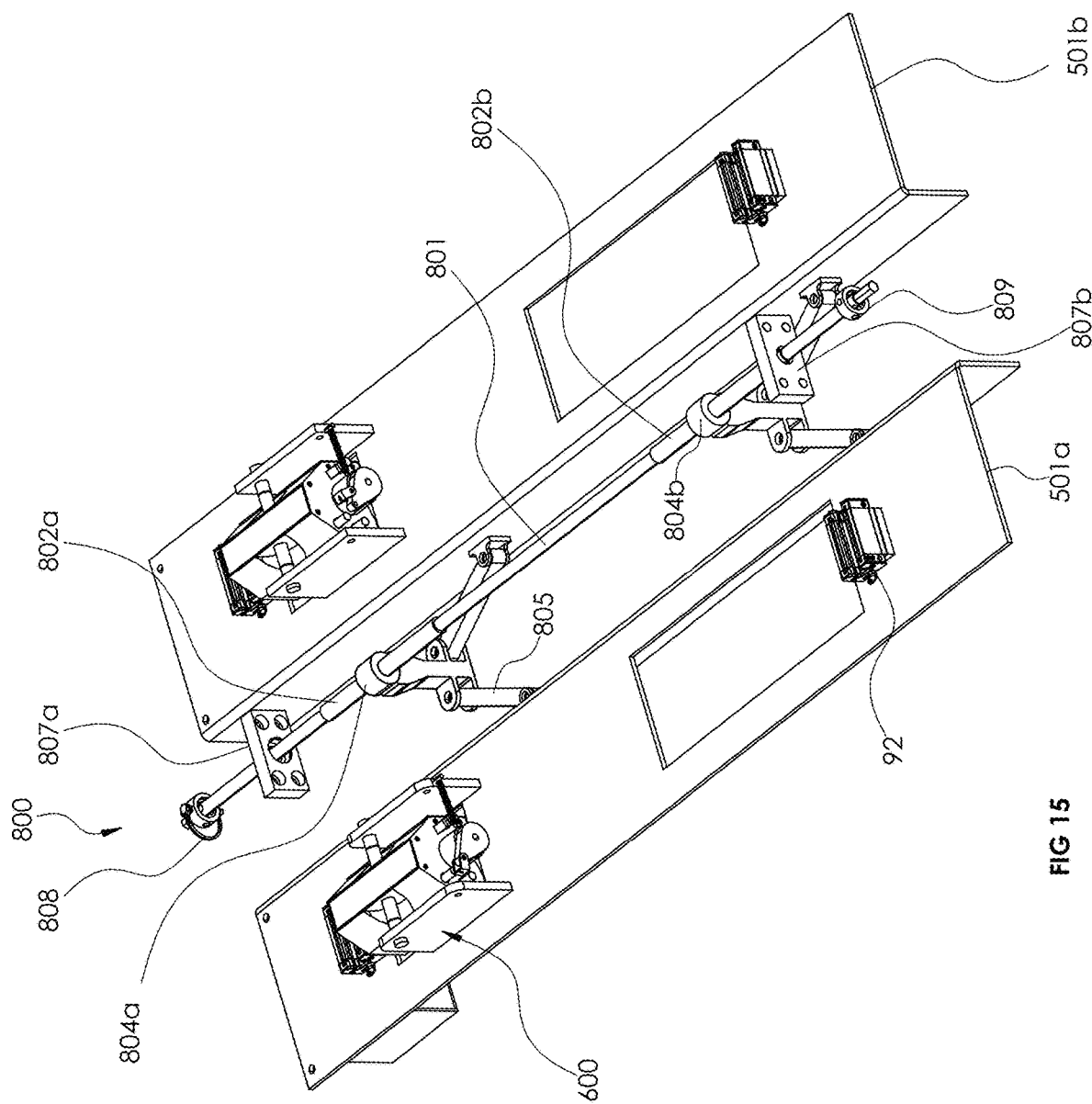
FIG. 15 is a perspective view of the fork guides with the magnet assembly and linear latch attached.

FIG. 15 is an isolated view of the guide spacer assembly 800 showing this component separate from the rest of the trailer 100 that it is part of. FIG. 8, the underside view of the trailer 100, also shows the guide spacer assembly 800 as attached within the trailer 100. The guide spacer assembly 800 consists of a rod 801 that runs the length of the trailer 100, and runs parallel with the fork guides 501 running from the front to the back of the trailer 100. There is a threaded section 802 that comprises most of the middle of the rod 801, and there are two threaded mounted bearings 807, a front mounted bearing 807a and a back mounted bearing 807b bolted to square tubes 104f and 104r. There are two threaded racers 804 mounted on the rod threaded section 802. The racer 804 is composed of a threaded nut with an extended body with hinges at the bottom that moves the spacing arms 805. There are two spacing arms 805a and 805b, rotatably attached to each racer 804 by a hinge, and each spacer arm 805a and 805b is attached to the fork guides 501a and 501b by a hinge 806. When the rod 801 is rotated the threaded portion 802 is also rotated and twists within the threaded nut racers 804 forcing them to move. There is a hex shaped nut at the front end of the rod 801 that is sized and configured to be rotated by means of a conventional crescent wrench or socket wrench, and that can be locked in place by means of a conventional clevis pin. As the operator turns the hex nut and hence the rod, the threaded nut races 804 move away from the carriage 15 and push apart the spacing arms 805, which in turn pushes apart the fork guides 501, which move on the linear carriages 502 on the linear rails 503 as described above. This allows the operator of the forklift to control the horizontal spacing separation of the fork guides 501 to allow the operator to properly position the fork guides 501 to properly align with the blades 41 of the forklift. The guide spacer assembly 800 can also be used to tighten the fork guides 501 onto the forks 41 (or 51) for additional secure attachments. The guides spacer assembly 800 also allows the position of the fork guides 501 to be adjusted to align with and engage with any spacing of the blades 41 (or 51), which allows the trailer 100 configured with the present invention to be used with any forklift 10 or pallet jack 50. This means that any forklift 10 or palate jack 50 can be turned into a tugger to move a trailer 100 or train of trailers.

There is a second component of the invention that allows for temporarily securing the trailer 100 onto the forks 51 of pallet jacks 50 to prevent the trailer 100 from moving or sliding off the forks 51 during tugging. This consists of the linear latch 700, which is attached to the top of the fork guide 501. The linear latch 700 can be seen in the isolated view of FIG. 15, and the components of the linear latch 700 are shown in FIG. 16a, b, & c, with FIG. 16a showing the underside of the linear latch 700, FIG. 16b showing the top of the linear latch, and FIG. 16c showing the side view. The fork guide 501 includes a latch cut out 504, seen in FIG. 8, which is an opening in the fork guide near the back of the trailer 100. The linear latch 700 includes two guide rails 91a and 91b that are attached on the top of the fork guides 501 on either side of the latch cut out 504. There is a blade housing 702 that is movably attached to the guide rail 91 by means of the bearing carriage 92, which includes internal rollers that allow the bearing carriage 92 to move along the guide rails 91. These carriages 92 and rails 91 are similar to the linear carriages 502 and rails 503 of the fork guides, and operate in the same manner. However the latch carriage 92 includes a standard carriage lock that allows the carriage to be locked into position on the rails. The blade housing 702 sits on top of the bearing carriage 92 and is attached by conventional means, which can be by welding or screws or bolts. There is a series of latch blades 701 or metal rods that are rotatably attached to the blade housing 702. The latch blades 701 will, at the designed position, rotate down and into the locking recess 57 located on the blades 51 of the pallet jack 50 to hold the trailer in place on the blades 51.

Figure 17:
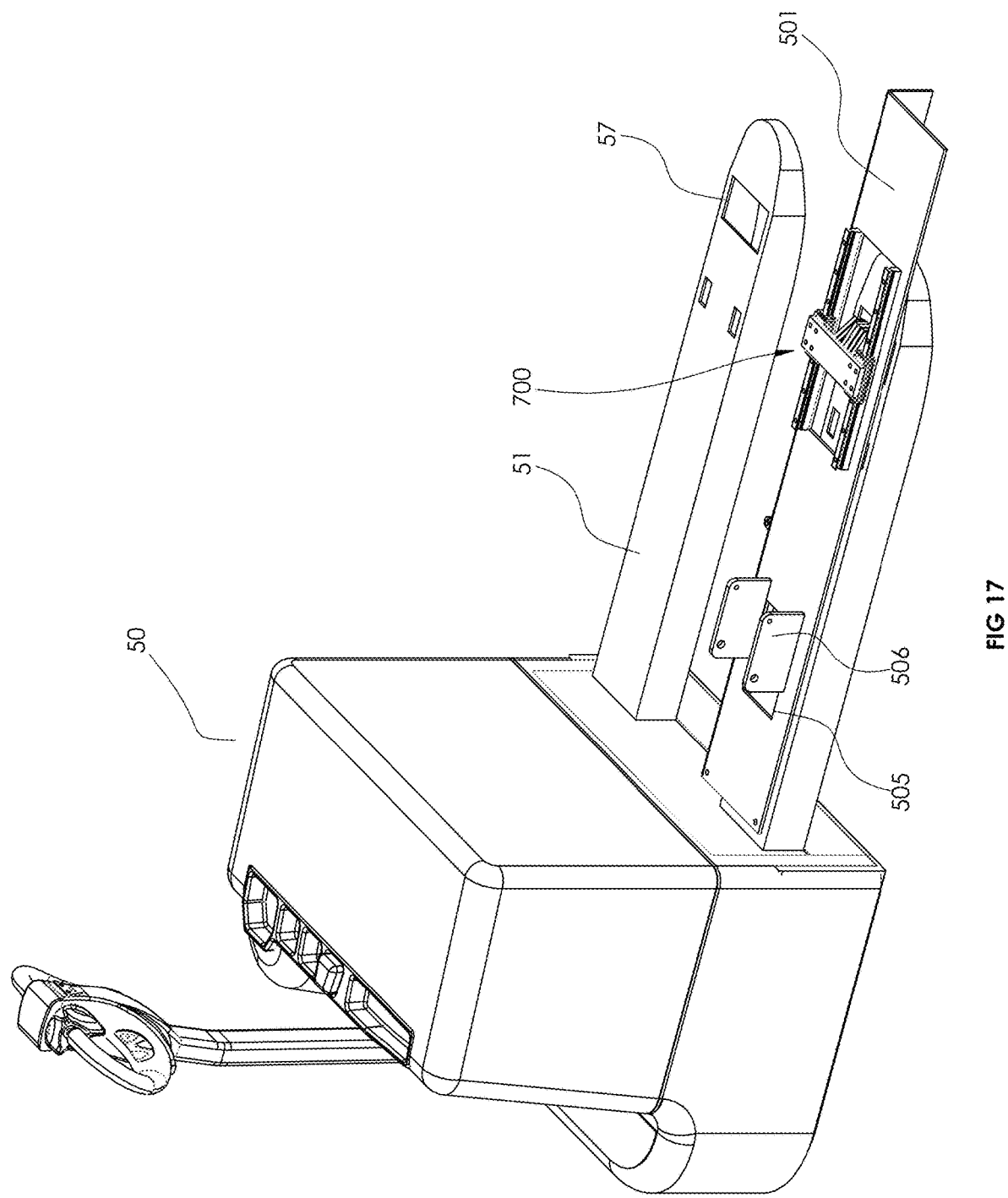
FIG. 17 is a perspective view of a pallet jack with an isolated view of one fork guide showing details of the linear latch.

FIG. 17 is an isolated view showing one fork guide 501 with the locking latch 700 in position on one blade 51, separate from the other components of the trailer 100 so that the components of the locking latch 700 can be described in relationship to the blade 51 of the pallet jack 50. The second blade 51 does not have a fork guide 501 in position so that the blade cut-out 57 is visible. The blade cut-out 57 is sized to accommodate the latch blades 701 of the locking latch 700. When the blades 51 are fully inserted into the two fork guides 501 the locking latch 700 will be positioned over the blade cut-out 57. At that point the latch blades 701 will drop down into the blade cut-out 57 by gravity, to hold the fork guide 501 in place on the blade 51. And since the fork guide 501 is securely attached to the trailer 100, this will lock the trailer 100 onto the blades 51 and prevent the trailer 100 from sliding off the blades 51 when the pallet jack 50 is in movement. This will also, particularly, prevent the trailer 100 from sliding away from the pallet jack 50 when the pallet jack 50 is moved to tow the trailer 100 or a train of trailers. To disengage the latch blades 701, the pallet jack blades 51 are lowered to the point where the latch blades 701 are no longer in the blade cut-out 57, and the blades can be withdrawn from the fork guides 501 of the trailer 100.

Figure 18:
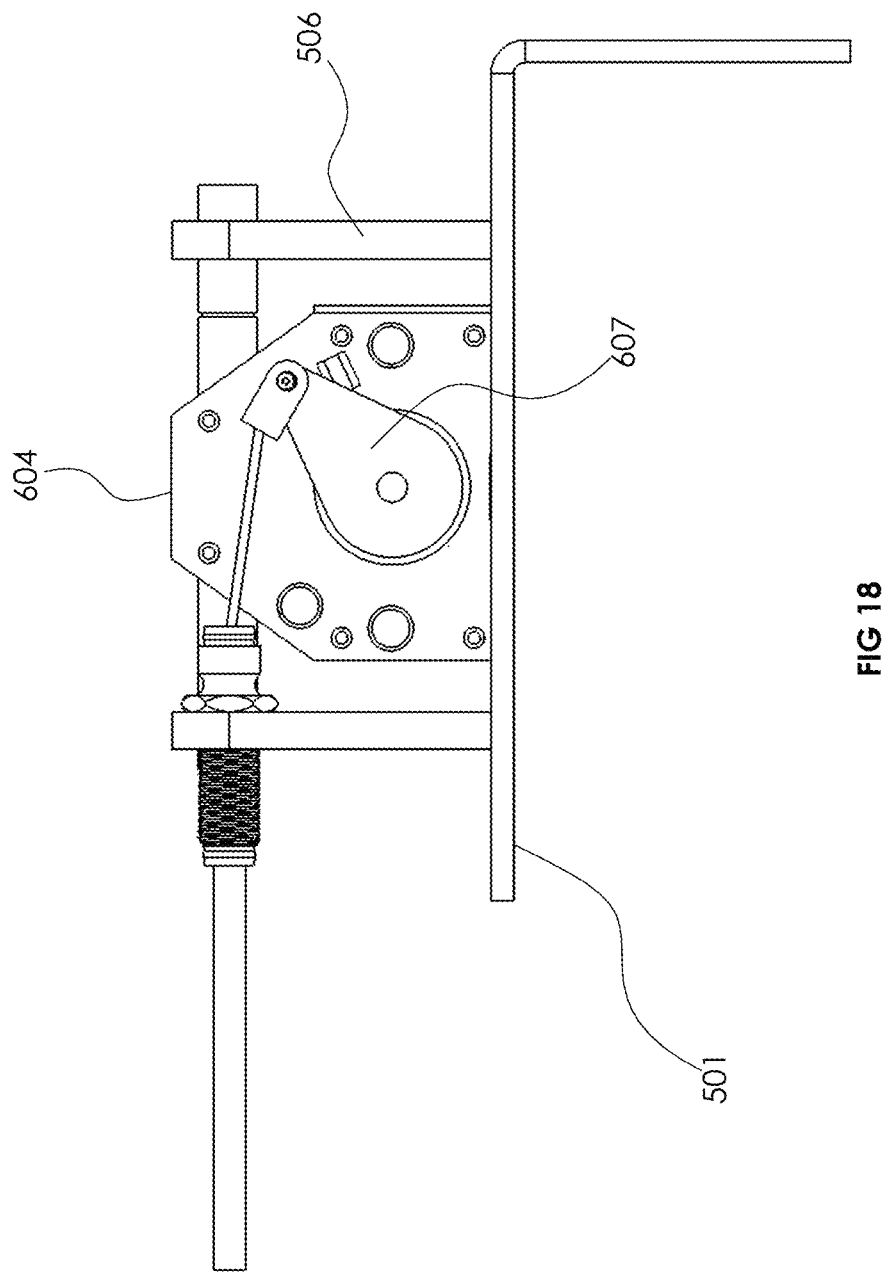
FIG. 18 is a front view of the magnet assembly.

There are also switchable magnets 604 that are attached to the fork guides 501 to further secure the trailer 100 to the blades 41 (or 51). The components of the magnet assembly 600 can be seen in the bottom view of the trailer 100 in FIG. 9, in the isolated view of the fork guides 501 showing most of the components of the magnet assembly 600 in the perspective view on a pallet jack in FIG. 15, and in the front view of the magnet assembly 600 in FIG. 18. There is a magnet cut-out 505 in the fork guide 501, and in one embodiment the metal from the fork guide that is cut for the cut-out is folded up to create the magnet mount 506 which holds the magnet assembly 600 in place. In other embodiments the magnet mount 506 is a metal plate attached next to the magnet cut-out 505. The magnet assembly 600 is bolted to the magnet mount 506, or attached by other known and conventional means. Switchable magnets are also known in the art as on/off magnets or lifting magnets. When the blades 51 are in position under the fork guides 501 the operator lowers the magnet engaging lever 601 which pulls a cable that turns the rotor 607 and engages the magnet 604. Since the blades 51 are made of a metal such as steel, the magnets 604 will attach. Once the operator is ready to withdraw the blades 51, he can lift the magnet engaging lever 601, which will turn the rotor 607 to switch off the magnet. The magnets provide additional attachment force between the trailer 100 and the blades 51 of the pallet jack 50 to further secure the trailer 100 in place during towing.

In use, a single operator will use the forklift 10 or pallet jack 50 to tow an empty trailer 100 to the aisle to retrieve palletized goods from a shelf. The operator will raise the blades 41 (or 51) and retrieve the desired pallet and place the pallet on the platform sheets 106a and 106b, and then realign the forklift 10 or pallet jack 50 to insert the blades 41 (or 51) into the fork guides 501. If a forklift 10 is being used the operator will drive forward and engage the L-shaped clip 402 of the fork truck clip assembly 400 with the inverted U-shaped slot of the trailer clip assembly as described above, slightly raise the lead trailer off the floor and then active the switchable magnets assembly 600 and the forklift can now tow the trailer 100. If a pallet jack 50 is being used the operator can insert the blades 51 into the fork guides 501a and 501b, and then secure the trailer 100 onto the forks by sliding the blades 51 forward to engage the linear latch 700 as described above, slightly raise the lead trailer off the floor and then active the switchable magnets assembly 600, as described above. The platform sheets 106a and 106b are hinged (at 108) which allows the operator to rotate the platform sheets 106a and 106b upwards, to allow access to the switchable magnet assembly 600, as well as the linear latch 700, and if necessary move the position of the linear latch 700 by unlocking the latch carriage 92 and moving it on the latch rails 91 to position it so that the latch blades 701 fit securely into the blade cut outs 57. The carriages 92 can then be locked into place. The operator can now tow the trailer 100 to a cross aisle and attach it to other trailers 100 that have already been loaded, and can attach these trailers in the known and conventional manner. Once a full logistic train of trailers has been assembled, the operator can tow the train to the loading dock, disengage, and removed the palletized articles and place them into a truck, or otherwise prepare them for shipment. In the alternative, the operator can tow a pre-attached logistics train of trailers to the appropriate aisle to pick up a load, disengage, retrieve the load from the storage shelves, place the load onto the trailer 100, then reattach the forklift 10 or pallet jack 50 to the lead trailer 100, and tow the train to the next appropriate aisle, and repeat the process until the logistics train is fully loaded, then tow it to the drop-off location.

As has been demonstrated from the sections above, the device for retro-fitting a logistics trailer to allow it to attach to any forked vehicle to thereby allow the forked vehicle to tow the trailer, and a train of trailers, has been shown as both versatile and practical. The present invention is well adapted to carry out the objectives and attain both the ends and the advantages mentioned, as well as other benefits inherent therein. While the present invention has been depicted, described, and is defined by reference to particular embodiments of the invention, such reference does not imply a limitation to the invention, and no such limitation is to be inferred. The depicted and described embodiments of the invention are exemplary only, and are not exhaustive of the scope of the invention. Consequently, the present invention is intended to be limited only be the spirit and scope of the claims, giving full cognizance to equivalents in all respects.

I claim:

1. A quick connect logistics trailer used with a forked vehicle, said quick connect logistics trailer comprising:
    a trailer having a frame consisting of a front square tube and a back square tube, and a left side rail and right side rail attached between the front square tube and back square tube, and wherein said frame has a top side and a bottom side;
    two fork pockets mounted on said top side of said frame by attaching to the left side rail and right side rail;
    two top platform sheets, each rotatably attached to one of the two fork pockets by a hinge that allows each of the two top platform sheets to be folded up to access the frame and attached components;
    wherein when folded down said two top platform sheets form a top platform to create a flat surface to place loads;
    four wheels mounted to said bottom side of said frame;
    two linear rails mounted on said frame bottom side by attaching to said right side rail and said left side rail;
    two fork guides movably mounted on said two linear rails by a movable linear carriage, wherein said fork guides are configured to accommodate a pair of fork blades attached to said forked vehicle;
    a spacer assembly mounted to said two fork guides;
    wherein said spacer assembly moves the two fork guides by said two movable linear carriages on said linear rails to align said fork guides with the fork blades of the forked vehicle;
    an attachment mechanism to removably and securely attach said quick connect logistics trailer to said forked vehicle when said fork blades are in said fork guides to allow said forked vehicle to tow said quick connect logistics trailer.

2. The quick connect logistics trailer of claim 1, wherein said spacer assembly comprises:
    a rod with a threaded section;
    two racers, each having a mounted bearing threadably attached to said threaded section of said rod;
    two pairs of spacer arms attached between each of said spacers and each of said two fork guides;
    wherein, when said rod is turned said racers move and thereby move said pairs of spacer arms to adjust the spacing of said fork guides.

3. The quick connect logistics trailer of claim 2, wherein the forked vehicle is a forklift having two forks each having a shank and a forward protruding fork blade, and wherein said attachment mechanism consists of:
    a fork truck clip removably and securely attached to said forklift adjacent to said blades;
    a trailer clip assembly removably and securely attached to said quick connect logistics trailer such that when said blades are inserted into said fork guides the fork truck clip attaches to said trailer clip to create a temporary and secure attachment between said trailer and said forklift, whereby said forklift can tow said trailer.

4. The quick connect logistics trailer of claim 3 wherein multiple trailers can be attached in series with said quick connect logistics trailer to create a logistic trailer train.

5. The quick connect logistics trailer of claim 3, wherein:
    said fork truck clip assembly consists of two side walls connected by a back bracket and a bottom bracket, and two L-shaped clips located on a bottom of said side walls;
    said trailer clip assembly consists of a grooved bar with notches attached to a front side of said frame of said quick connect logistics trailer, and a trailer clip removably attached to said grooved bar with notches, said trailer clip having an inverted U-shaped connection slot;
    wherein said L-shaped clips insert into said inverted U-shaped connection slots to temporarily and securely attach said fork truck clip assembly to said trailer clip assembly, and thereby temporarily and securely attach said quick connect logistics trailer to said forklift to allow said forklift to tow said quick connect logistics trailer.

6. The quick connect logistics trailer of claim 2, wherein the forked vehicle is a pallet jack having two forward protruding fork blades, each fork blade having a forward cut-out, and wherein said attachment mechanism consists of:
- one linear latch attached to each of the two fork guides, each linear latch having a multiplicity of blades that insert into each of the forward cut-outs to secure said fork blade within said fork guides,
- two switchable magnets attached to each of the two fork guides, wherein each of said two switchable magnets are activated to magnetically attach said fork guides to said fork blades;
- thereby securing said fork blades within said fork guide and thus securing said quick connect logistics trailer to said pallet jack to allow said pallet jack to tow said quick connect trailer.

7. The quick connect logistics trailer of claim 6, wherein multiple trailers can be attached in series with said quick connect logistics trailer to create a logistic trailer train.

\* \* \* \* \*